United States Patent
Peltz et al.

(10) Patent No.: US 11,465,090 B2
(45) Date of Patent: *Oct. 11, 2022

(54) PARTICULATE FILTER AND METHODS FOR REMOVING PARTICULATES FROM A PARTICULATE FILTER

(71) Applicant: The Boeing Company, Chicago, IL (US)

(72) Inventors: Leora Peltz, Pasadena, CA (US); Kavya K. Manyapu, Houston, TX (US)

(73) Assignee: The Boeing Company, Chicago, IL (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/847,602

(22) Filed: Apr. 13, 2020

(65) Prior Publication Data

US 2021/0086122 A1 Mar. 25, 2021

Related U.S. Application Data

(60) Provisional application No. 62/904,645, filed on Sep. 23, 2019.

(51) Int. Cl.
*B01D 46/66* (2022.01)
*B01D 46/52* (2006.01)
(Continued)

(52) U.S. Cl.
CPC ....... *B01D 46/785* (2022.01); *B01D 46/0001* (2013.01); *B01D 46/0043* (2013.01);
(Continued)

(58) Field of Classification Search
CPC .... B01D 46/785; B01D 46/521; B01D 46/10; B01D 46/58; B01D 46/0001;
(Continued)

(56) References Cited

U.S. PATENT DOCUMENTS 3,408,794 A 11/1968 Stoddard
3,545,178 A * 12/1970 Sheehan ............... B01D 46/785
55/300

(Continued)

FOREIGN PATENT DOCUMENTS

| DE | 102010008449 | 8/2018 |
|---|---|---|
| JP | S58143815 | 8/1983 |
| WO | 2016130888 | 8/2016 |

OTHER PUBLICATIONS

International Search Report and Written Opinion issued by the European Patent Office in International Application No. PCT/US2020/051886 dated Oct. 28, 2020 (15 pages).

(Continued)

*Primary Examiner* — Robert Clemente
(74) *Attorney, Agent, or Firm* — McDonnell Boehnen Hulbert & Berghoff LLP

(57) ABSTRACT

In an example, a particulate filter includes a porous filter substrate including a first surface and a second surface. The porous filter substrate is configured to filter gas flowing through the porous filter substrate between the first surface and the second surface. A plurality of conductors are coupled to the porous filter substrate. The plurality of conductors are approximately parallel to each other along the porous filter substrate. The particulate filter also includes a plurality of input nodes in signal communication with the plurality of conductors and configured to receive a voltage signal from an input signal source. The plurality of conductors are configured to generate an electric field on at least one of the first surface or the second surface of the porous filter substrate in response to the plurality of input nodes receiving the voltage signal from the input signal source.

20 Claims, 18 Drawing Sheets

(51) Int. Cl.
*B01D 46/42* (2006.01)
*B01D 46/48* (2006.01)
*B01D 46/00* (2022.01)
*B01D 46/44* (2006.01)
*B01D 46/46* (2006.01)
*B01D 46/58* (2022.01)

(52) U.S. Cl.
CPC ..... *B01D 46/4227* (2013.01); *B01D 46/4245* (2013.01); *B01D 46/44* (2013.01); *B01D 46/442* (2013.01); *B01D 46/46* (2013.01); *B01D 46/48* (2013.01); *B01D 46/521* (2013.01); *B01D 46/58* (2022.01); *B01D 2273/30* (2013.01); *B01D 2275/203* (2013.01)

(58) Field of Classification Search
CPC ............ B01D 46/0043; B01D 46/4227; B01D 46/4245; B01D 46/44; B01D 46/442; B01D 46/46; B01D 46/48; B01D 2273/30; B01D 2275/203
See application file for complete search history.

(56) References Cited

U.S. PATENT DOCUMENTS

| | | |
|---|---|---|
| 4,400,971 A | 8/1983 | Tassicker |
| 5,457,945 A | 10/1995 | Adiletta |
| 5,763,069 A | 6/1998 | Jordan |
| 5,780,811 A | 7/1998 | Kawamura |
| 8,091,589 B2 | 1/2012 | Yokokawa |
| 8,939,179 B2 | 1/2015 | Janicijevic et al. |
| 10,016,766 B2 | 7/2018 | Manyapu et al. |
| 10,507,627 B2 | 12/2019 | Manyapu et al. |
| 2007/0089799 A1 | 4/2007 | Zorini |
| 2008/0229931 A1 | 9/2008 | Katsuyama et al. |
| 2013/0298399 A1 | 11/2013 | Trigwell et al. |
| 2017/0022638 A1 | 1/2017 | Schnabel et al. |
| 2018/0003609 A1 | 1/2018 | Uchiyama |
| 2019/0388904 A1* | 12/2019 | Yuge .................. B03C 3/41 |
| 2020/0061635 A1* | 2/2020 | Wiser, III ............ B03C 3/64 |

OTHER PUBLICATIONS

Calle, et al., "Dust Particle Removal by Electrostatic and Dielectrophoretic Forces with Applications to NASA Exploration Missions", Pro ESA Annual Meeting on Electrostatics, 2008, Paper 01, pp. 1-14.

Manyapu et al., "Investigating the Feasibility of Utilizing Carbon Nanotube Fibers for Spacesuit Dust Mitigation", 46th International Conference on Environmental Systems, Jul. 10-14, 2016, Vienna Austria, pp. 1-14.

Kawamoto et al., "Electrostatic Cleaning System for Removing Lunar Dust Adhering to Space Suits", Journal of Aerospace Engineering, Oct. 2011, pp. 442-444.

* cited by examiner

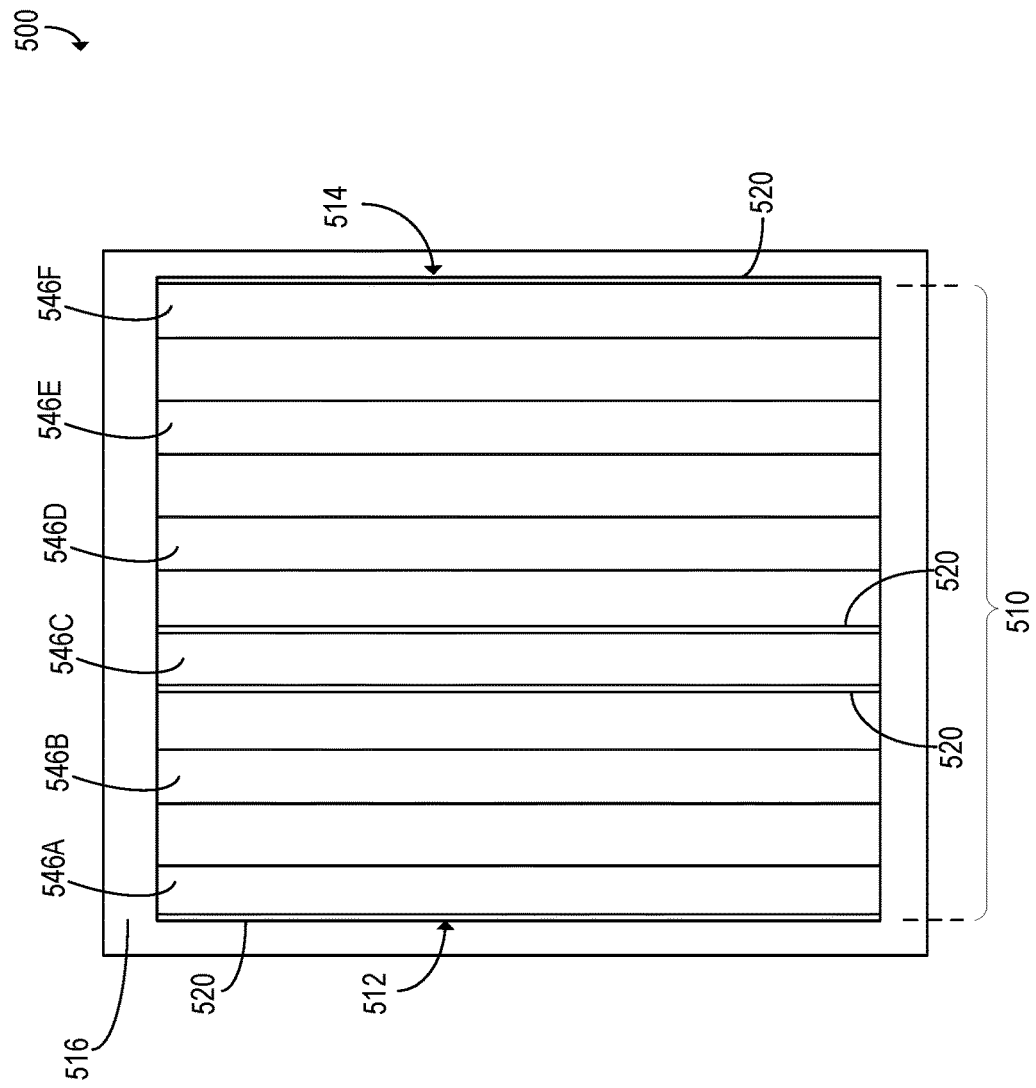

PARTICULATE FILTER AND METHODS FOR REMOVING PARTICULATES FROM A PARTICULATE FILTER

CROSS-REFERENCE TO RELATED APPLICATIONS

The present application claims the benefit of U.S. Provisional Application No. 62/904,645, filed Sep. 23, 2019, which application is entirely incorporated herein by reference.

FIELD

The present disclosure generally relates to filters and, more specifically, to filters having a particulate mitigation system.

BACKGROUND

A particulate filter is a device, which removes solid particulates such as dust, pollen, mold, and/or bacteria from a gas such as, for example, air. One type of particulate filter uses mechanical filtration to capture and separate the particulates from the gas as the gas flows through the particulate filter.

SUMMARY

In an example, a particulate filter includes a porous filter substrate including a first surface and a second surface. The porous filter substrate is configured to filter gas flowing through the porous filter substrate between the first surface and the second surface. A plurality of conductors are coupled to the porous filter substrate. The plurality of conductors are approximately parallel to each other along the porous filter substrate. The particulate filter also includes a plurality of input nodes in signal communication with the plurality of conductors and configured to receive a voltage signal from an input signal source. The plurality of conductors are configured to generate an electric field on at least one of the first surface or the second surface of the porous filter substrate in response to the plurality of input nodes receiving the voltage signal from the input signal source.

In another example, a method of removing particulates from a particulate filter includes receiving a voltage signal from an input signal source at a plurality of input nodes of the particulate filter. The particulate filter includes a porous filter substrate and a plurality of conductors coupled to the porous filter substrate. The porous filter substrate is configured to filter a gas flowing between a first surface of the porous filter substrate and a second surface of the porous filter substrate. The plurality of conductors are approximately parallel to each other along the porous filter substrate. The plurality of input nodes are in signal communication with the plurality of conductors. The method further includes generating, using the voltage signal on the plurality of conductors, an electric field on at least one of the first surface or the second surface of the porous filter substrate. The method also includes removing, using the electric field, particulates from the at least one of the first surface or the second surface.

In another example, a method of making a particulate filter includes coupling a porous filter substrate to a frame. The porous filter substrate includes a first surface and a second surface. The porous filter substrate is configured to filter gas flowing through the porous filter substrate between the first surface and the second surface. The method also includes coupling a plurality of conductors to the porous filter substrate such that the plurality of conductors are approximately parallel to each other along the porous filter substrate, and forming a plurality of input nodes in signal communication with the plurality of conductors and configured to receive a voltage signal from an input signal source. The plurality of conductors are configured to generate an electric field on at least one of the first surface or the second surface of the porous filter substrate in response to the plurality of input nodes receiving the voltage signal from the input signal source.

In another example, a filter system includes a particulate filter and an electromagnetic field generator. The particulate filter includes a porous filter substrate including a first surface and a second surface. The porous filter substrate is configured to filter a gas flowing through the porous filter substrate between the first surface and the second surface. The particulate filter also includes a plurality of conductors coupled to the porous filter substrate. The conductors are approximately parallel to each other along the porous filter substrate. The particulate filter further includes a plurality of input nodes in signal communication with the plurality of conductors and configured to receive a voltage signal from an input signal source. The plurality of conductors are configured to generate an electric field on at least one of the first surface or the second surface of the porous filter substrate in response to the plurality of input nodes receiving the voltage signal from the input signal source.

The electromagnetic field generator is positioned upstream of the particulate filter along a flow path of the gas. The electromagnetic field generator is operable to generate an electromagnetic field configured to electrically charge particulates in the gas prior to the gas flowing through the porous filter substrate.

According to another example, a filter system includes a particulate filter, a gas recirculation system, and a controller. The particulate filter includes a porous filter substrate including a first surface and a second surface. The porous filter substrate is configured to filter a gas flowing through the porous filter substrate in a direction from the first surface toward the second surface. The particulate filter also includes a plurality of conductors coupled to the porous filter substrate. The plurality of conductors are approximately parallel to each other along the porous filter substrate. The particulate filter further includes a plurality of input nodes in signal communication with the plurality of conductors and configured to receive a voltage signal from an input signal source. The plurality of conductors are configured to generate an electric field on at least one of the first surface or the second surface of the porous filter substrate in response to the plurality of input nodes receiving the voltage signal from the input signal source.

The gas recirculation system includes a duct having an inlet and an outlet. The inlet of the duct is configured to receive, into the duct, the gas exiting the particulate filter at the second surface. The outlet of the duct is configured to output the gas from the duct to the particulate filter at the first surface. The controller is in communication with the input signal source. The controller is configured to (i) cause the input signal source to provide a first voltage signal while the gas flows through the porous filter substrate a first time, and (ii) after the gas is recirculated by the gas recirculation system, cause the input signal source to provide a second voltage signal while the gas flows through porous filter substrate a second time. The first voltage signal differs from the second voltage signal.

According to another example, a filter system includes a particulate filter and a gas mover. The particulate filter includes a porous filter substrate including a first surface and a second surface. The porous filter substrate is configured to filter a gas flowing through the porous filter substrate between the first surface and the second surface. The particulate filter also includes a plurality of conductors coupled to the porous filter substrate. The conductors are approximately parallel to each other along the porous filter substrate. The particulate filter also includes a plurality of input nodes in signal communication with the plurality of conductors and configured to receive a voltage signal from an input signal source. The plurality of conductors are configured to generate an electric field on at least one of the first surface or the second surface of the porous filter substrate in response to the plurality of input nodes receiving the voltage signal from the input signal source.

The gas mover positioned upstream of the particulate filter along a flow path of the gas. The gas mover is operable to generate a turbulence in gas prior to the gas flowing through the porous filter substrate.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 5 depicts a cross-sectional view of a particulate filter, according to another example.

DETAILED DESCRIPTION

Figure 1:
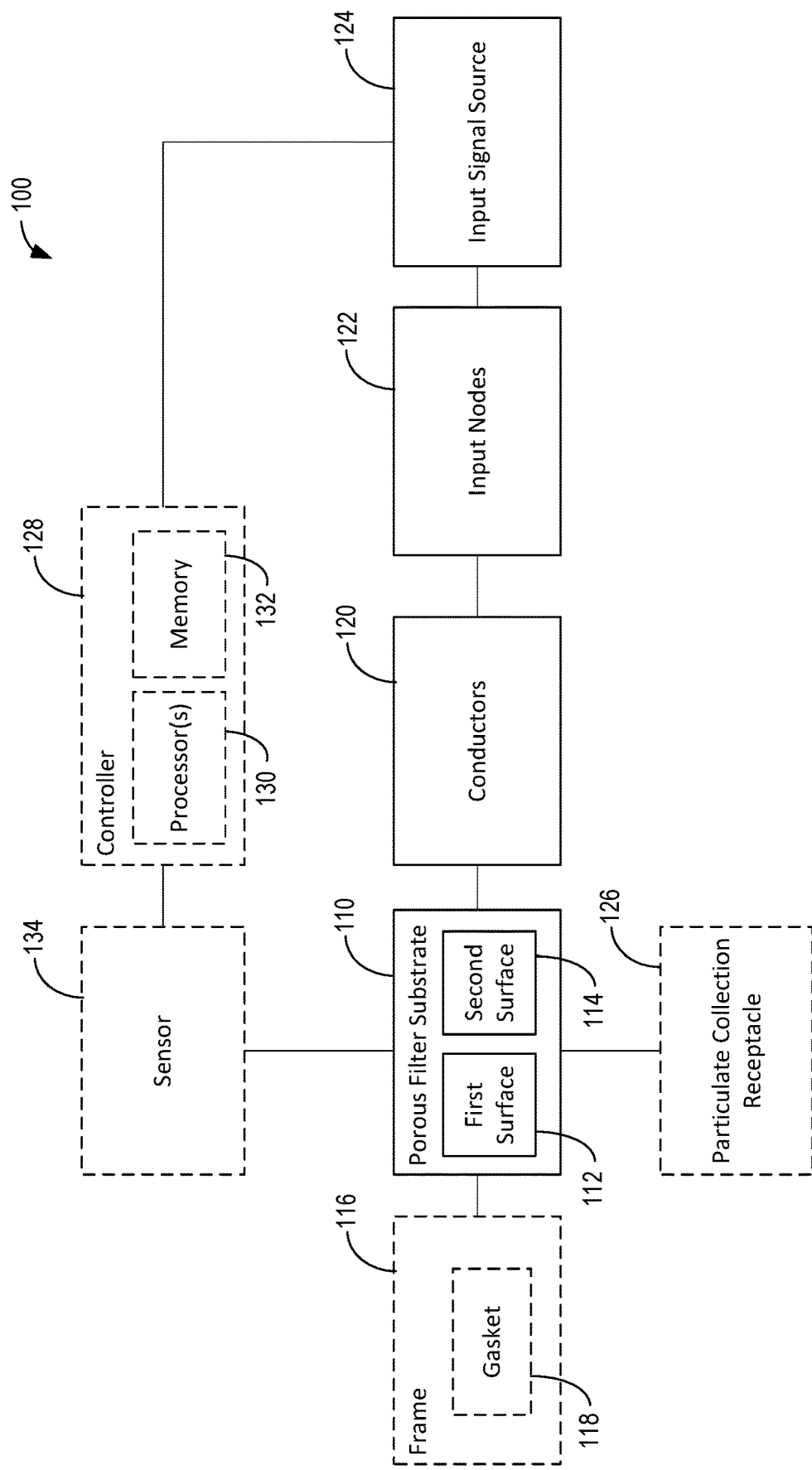
FIG. 1 depicts a simplified block diagram of a particulate filter, according to an example.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the term "approximately" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the terms "greater than" and "less than" are intended to have their common meaning. Thus, a first value is greater than a second value if the first value is greater than the second value by any amount. Similarly, a first value is less than a second value if the first value is less than the second value by any amount.

As noted above, a particulate filter can capture and separate particulates from a gas as the gas flows through the particulate filter. For example, the particulate filter can include a porous filter substrate that can capture and retain the particulates in the gas by impaction, interception, and/or diffusion mechanisms. Over the life of the particulate filter, the particulates may accumulate on the porous filter substrate and may impede a flow of the gas through the particulate filter (i.e., the accumulation of the particulates may clog the particulate filter). As such, the accumulated particulates may reduce the efficiency of the particulate filter.

One approach to addressing the reduced efficiency of the particulate filter due to the accumulated particulates is to manually clean the porous filter substrate. This approach can be labor intensive, time consuming, and/or inefficient. Another approach is to remove the existing porous filter substrate and replace it with a new porous filter substrate. This approach can be expensive, labor intensive, and/or time consuming. Additionally, in some instances, the approach of replacing the porous filter substrate may involve storing a plurality of replacement filter substrates on-site and, thus, may involve challenging storage space and supply logistics considerations. For instance, storing a plurality of replacement filter substrates for a spacecraft application may provide challenges to meeting space-constraint and/or weight limit considerations associated with efficiently operating a spacecraft.

Within examples, a particulate filter is described that can address one or more of the above-described challenges associated with particulates accumulating on the particulate filter over time. Specifically, within examples, a particulate filter can include a plurality of conductors coupled to a porous filter substrate and configured to generate an electric field on at least one of a first surface or a second surface of the porous filter substrate in response to a voltage signal from an input signal source. When the electric field is generated, the electric field can repel and remove particulates accumulated on the porous filter substrate, and/or repel particulates to inhibit the particulates from accumulating on the porous filter substrate. In this way, the particulate filter can provide for cleaning the porous filter substrate without (or reduced) manual intervention. This can help to provide for more efficient, frequent, and/or rapid cleaning of the porous filter substrate. Additionally, the particulate filter described herein can address challenges associated with replacing porous filter substrates and/or storing replacement porous filter substrates described above.

Referring now to FIG. 1, a particulate filter 100 for filtering one or more particulates in a gas is shown according to an example. Within examples, the particulate(s) can include dust (e.g., terrestrial dust and/or dust from an extra-terrestrial environment), mold spores, bacteria, microorganisms, fabric lint, food debris, metal debris, wood debris, and/or plastic debris. Also, within examples, the gas can include air, nitrogen, hydrogen, oxygen, and/or carbon dioxide. The particulate filter 100 can be employed in a variety of environments to filter the gas and remove the particulate(s). As examples, the particulate filter 100 can be used to filter gas in a ventilation system, a spacecraft, a space habitat, and/or a spacesuit.

As shown in FIG. 1, the particulate filter 100 includes a porous filter substrate 110 having a first surface 112 and a second surface 114. In general, the porous filter substrate 110 is configured to filter a gas flowing through the porous filter substrate 110 between the first surface 112 and the second surface 114 by removing the particulate(s) from the gas. For instance, the porous filter substrate 110 can be configured to capture and retain the particulate(s) in the gas by impaction, interception, and/or diffusion mechanisms. Capturing and retaining the particulate(s) can help to improve a quality of the gas and, in some instances, mitigate potential undesirable consequences associated with exposing people and/or equipment to the particulate(s).

As examples, the porous filter substrate 110 can be formed of a paper material (e.g., TYVEK®), a woven fabric, a non-woven fabric, a fibrous material, an elastomer, a flexible material, an inflexible material, and/or a porous film. More generally, the porous filter substrate 110 can include one or more materials that define a plurality of pores between the first surface 112 and the second surface 114, and a size of the pores can affect a rate of flow of the gas through the porous filter substrate 110 and an extent to which the porous filter substrate 110 captures the particulate(s). For instance, relatively larger pores can help to increase the rate of flow of the gas through the porous filter substrate 110, whereas relatively smaller pores can help to capture types of particulate(s) having a relatively particle size.

In one example, the pores of the porous filter substrate 110 can have an average pore size of approximately 0.5 microns to approximately 100 microns. In another example, the pores of the porous filter substrate 110 can have an average pore size of approximately 0.5 microns to approximately 5.0 microns. In yet another example, the pores of the porous filter substrate 110 can have an average pore size of approximately 1.0 microns to approximately 2.5 microns. However, in other examples, the pores of the porous filter substrate 110 can have an average pore size that is less than 0.05 microns or greater than 3.0 microns. The average pore size of the porous filter substrate 110 can be determined by a particle size of the particulates intended to be filtered out and one or more porous filter substrates 110 of the different pore sizes may be used to filter different particle sizes.

In one example, the porous filter substrate 110 can have a plurality of accordion-folded pleats including a plurality of panels and a plurality of fold lines between respective ones of the plurality of panels. This can help to increase a surface area of the porous filter substrate 110 and, thus, improve filtering efficiency relative to a porous filter substrate 110 that is not pleated. However, in other examples, the porous filter substrate 110 can be non-pleated. In some instances, a non-pleated geometry can help to reduce a cost of manufacture and/or facilitate disposing the porous filter substrate 110 in relatively small spaces (e.g., by reducing a depth of the porous filter substrate 110 relative to a porous filter substrate 110 that is pleated).

Physical characteristics of the porous filter substrate 110 can be selected based on one or more factors such as, for instance, (i) type of gas to be filtered, (ii) a type of particulate(s) that the porous filter substrate 110 is configured to capture and retain while passing the gas through the porous filter substrate 110, and/or (iii) an environment in which the particulate filter 100 is located. For instance, a porosity (i.e., a percentage of open space in a volume of the porous filter substrate 110), a geometry, and/or a material type of the porous filter substrate 110 can be based on these factors to achieve at least a threshold performance efficiency of the particulate filter 100.

Also, the particulate filter 100 can be deployed in environments in which the gas flows through the porous filter substrate 110 as a pressurized gas (e.g., at a pressure that is greater than an ambient pressure) and/or an unpressurized gas (e.g., at the ambient pressure). The physical characteristics of the porous filter substrate 110 can be additionally or alternatively selected based on an expected pressure of the gas that flows through the porous filter substrate 110. For instance, the porous filter substrate 110 can be configured to have a relatively lesser porosity when the gas is pressurized, whereas the porous filter substrate 110 can be configured to have a relatively greater porosity when the gas is unpressurized (e.g., a first porous filter substrate 110 can have a first porosity in a first environment in which a gas flows at a first pressure, and a second porous filter substrate 110 can have a second porosity in a second environment in which the gas flows at a second pressure, where the first pressure is less than the second pressure and the first porosity is greater than the second porosity).

The particulate filter 100 can also include a frame 116 coupled to and supporting the porous filter substrate 110. In one example, the frame 116 can define an aperture and the porous filter substrate 110 can be coupled to the frame 116 such that the porous filter substrate 110 is positioned in the aperture. This can allow for the gas to flow through the frame 116 and the porous filter substrate 110. Within examples, the frame 116 can be configured such that the aperture defined by the frame 116 has a rectangular shape, a square shape, a circular shape, an oval shape, a triangular shape, a polygonal shape, and/or a non-polygonal shape.

In other examples, the particulate filter 100 can omit the frame 116. For instance, the particulate filter 100 can omit the frame 116 in implementations in which the porous filter substrate 110 is self-supporting. As an example, the porous filter substrate 110 can be made from a material having a rigidity that allows the porous filter substrate 110 to maintain a predetermined shape under expected operating conditions such that the porous filter substrate 110 is self-supporting. In implementations in which the porous filter substrate 110 is self-supporting, the porous filter substrate 110 can have a pleated configuration and/or a non-pleated configuration as described above.

As examples, the frame 116 can be coupled to the porous filter substrate 110 by a weld, an adhesive, a non-adhesive bond, a snap-fit retention feature, a friction coupling, and/or a plurality of hook-and-loop fasteners (e.g., VELCRO®). In some implementations, the frame 116 can be configured to form a seal at an interface between the frame 116 and the porous filter substrate 110. This can help to reduce (or may prevent) the gas from flowing around the porous filter substrate 110 as opposed to through the porous filter substrate 110. As one example, the frame 116 includes a gasket 118 for sealing the interface between the frame 116 and the porous filter substrate 110 in FIG. 1.

In some examples, the frame 116 can have a rigidity that is suitable to maintain a shape of the porous filter substrate 110 and/or retain the porous filter substrate 110 in a fixed location relative to a structure in the environment in which the particulate filter 100 is deployed. This may be beneficial, for example, in implementations in which the porous filter substrate 110 is made from a relatively flexible material. However, in other examples, the particulate filter 100 can omit the frame 116 and the particulate filter 100 may be self-supporting.

During operation, the particulate(s) may accumulate on the first surface 112 and/or the second surface 114 of the porous filter substrate 110. As described above, the accumulated particulate(s) on the porous filter substrate 110 can reduce an efficiency of the particulate filter 100 and, thus, it may be desirable to clean the porous filter substrate 110 to remove the particulate(s). Within examples, the particulate filter 100 can remove the particulate(s) from the porous filter substrate 110 by generating an electric field on the first surface 112 and/or the second surface of the porous filter substrate 110. Specifically, the electric field can be configured to use at least one force chosen from an electrostatic force, an electrodynamic force, and a dielectrophoretic force to repel and/or move the particulate(s) off of the porous filter substrate 110.

As shown in FIG. 1, the particulate filter 100 also includes a plurality of conductors 120 coupled to the porous filter substrate 110 and a plurality of input nodes 122 in signal communication with the conductors 120. The input nodes 122 are configured to receive a voltage signal from an input signal source 124. As examples, the input nodes 122 can include at least one electrical connector selected from among a group including: a conductive fastener, a mechanical clamp, a twisting cap, a crimp sleeve connector, and a pin connector. The input nodes 122 can additionally include an electrical insulating material that is arranged to insulate the conductors 120 from each other and mitigate a short circuit between the conductors 120.

The type of input node 122 that is selected for the particulate filter 100 may be based on an environment and/or a context in which the particulate filter 100 will be used. For instance, the type of input nodes 122 can be selected based on at least one factor selected from a group of factors consisting of: a mechanical strength of the input nodes 122, a weight of the input nodes 122, a size of the input nodes 122, and an electrical insulating property of the input nodes 122. In some environments, it may be beneficial to have to select a type of input node 122 that have a mechanical strength that is suitable to resist decoupling of the conductors 122 with the input signal source 124, a weight that is suitable to meet weight-limit considerations for the environment and/or use context in which the particulate filter 100 will be used (e.g., a spacecraft and/or an aircraft), a size that is suitable to meet size limitation considerations for the environment and/or use context in which the particulate filter 100 will be used, and/or an electrical insulating property that is suitable to mitigate a short circuit between the conductors 120.

In some implementations, the input nodes 122 can be a standalone structure. In alternative implementations, the input nodes 122 can be part of the frame 116. For example, in one implementation, the input nodes 122 can be integrally formed with the frame 166 by a three-dimensional printing manufacturing process. Integrating the input nodes 122 with the frame 116 can help to, for instance, reduce a size and/or a weight of the particulate filter 100 relative to a particulate filter 100 in which the input nodes 122 are separate from the frame 116.

As described in further detail below, the input signal source 124 can generate the voltage signal, the input nodes 122 can include electrodes for receiving the voltage signal and transmitting the voltage signal to the conductors 120, and the conductors 120 can use the voltage signal to radiate an electric field for manipulating the particulate(s) on and/or adjacent to the porous filter substrate 110.

In general, the conductors 120 are configured to generate the electric field on at least one of the first surface 112 or the second surface 114 of the porous filter substrate 110 in response to the input nodes 122 receiving the voltage signal from the input signal source 124. In some examples, the conductors 120 can be coupled to the first surface 112 of the porous filter substrate 110 and the second surface 114 of the porous filter substrate 110. In this arrangement, the conductors 120 can provide the electric field in a manner that can help to clean both sides of the porous filter substrate 110 on which the particulate(s) may accumulate while filtering the gas. However, in other examples, the conductors 120 can be coupled to only the first surface 112 or the conductors 120 can be coupled to only the second surface 114. This may be useful in implementations in which personnel may come into contact with the one of the first surface 112 or the second surface 114 that omits the conductors 120.

Within examples, the conductors 120 can be coupled to the porous filter substrate by weaving, screen printing, and/or stamping the conductors 120 on the first surface 112 and/or the second surface 114 of the porous filter substrate 110. For instance, in one implementation, the conductors 120 can include a plurality of conductive fibers (e.g., carbon nanotube fibers and/or graphite fibers) woven into the porous filter substrate 110. The conductive fibers can be made from an electrically conductive material that (i) is resilient to fatigue such that the conductive fibers can repeatedly change shape without breaking, and (ii) has a tensile strength that resists tearing. This may be beneficial in implementations in which the porous filter substrate 110 is a woven material and/or a fibrous material. This may additionally or alternatively be beneficial in an implementation in which the porous filter substrate 110 is likely to experience changes in shape. In another implementation, for instance, the conductors 120 can include a conductive material (e.g., a metal and/or a conductive polymer) on at least one of the first surface 112 of the porous filter substrate 110 or the second surface 114 of the porous filter substrate 110. This may be beneficial in implementations in which the porous filter substrate 110 is a non-woven material and/or a non-fibrous material. This may additionally or alternatively be beneficial in an implementation in which the porous filter substrate 110 is unlikely to experience changes in shape.

In general, the conductors 120 are approximately parallel to each other along the porous filter substrate 110. As described in further detail below, this can help to generate the electric field that can repel and/or move the particulate(s) off of the porous filter substrate 110. By the term "approximately parallel", it is meant that the conductors 120 are parallel despite deviations or variations due to manufacturing tolerances, measurement error, measurement accuracy limitations and other factors that may occur due to real-world constraints of manufacturing and/or measuring physical devices.

A position of the conductors 120 on the porous filter substrate 110 and/or a spacing between the conductors 120 can also affect the electric field that is generated by the conductors 120 to repel and/or move the particulate(s) off of the porous filter substrate 110. As such, the position and/or the spacing of the conductors 120 on the porous filter substrate 110 can be based on the type and/or the size of particulate(s) that are to be repelled and/or moved by the electric field. The positioning and/or the spacing of the conductors 120 on the porous filter substrate 110 can additionally or alternatively be based on a geometry and/or a porosity of the porous filter substrate 110. FIGS. 2-7D depict various arrangements of the conductors 120 on the porous filter substrate 110 according to some examples. In one example, the conductors 120 can be spaced from each other by approximately 1 millimeter (mm) to approximately 2 mm. In another example, the conductors 120 can be spaced from each other by approximately 0.3 mm to approximately 4.0 mm.

The input signal source 124 can be an alternating current (AC) voltage source and/or a direct current (DC) voltage source. As examples, the input signal source 124 can include a battery co-located with the particulate filter 100, and/or an external power source (e.g., an electric grid, a battery, and/or a renewable energy power generation system such as a wind power system, a hydro-electric power generation system, a solar power generation system, and/or a fuel cell power generation system).

Further, within examples, the input signal source 124 can be configured to provide a single phase AC signal and/or a multi-phase AC signal. The input signal source 124 can provide the single phase AC signal and/or a DC signal to cause the conductors 120 to generate the electric field in the form of a standing wave on the first surface 112 and/or the second surface 114 of the porous filter substrate 110. Generating the electric field in the form of a standing wave can help to remove and repel particulate(s) from the first surface 112 and/or the second surface 114 of the porous filter substrate 110 (e.g., by breaking adhesive forces or cohesive forces between the particulate(s) and the porous filter substrate 110, for example, due to electrostatics or Van der Waal forces). This can thus help to remove the particulate(s) that have accumulated on the porous filter substrate 110 (i.e., clean the porous filter substrate 110) and/or inhibit other particulate(s) from accumulating on the porous filter substrate 110 while the standing wave of the electric field is active.

The input signal source 124 can additionally or alternatively provide the multi-phase AC signal such that the electric field, which is generated by the conductors 120, forms a traveling wave along the first surface 112 and/or the second surface 114. Specifically, the conductors 120 can extend in a first direction along the porous filter substrate 110, and the traveling wave can travel along the first surface 112 and/or the second surface 114 in a second direction that is transverse to the first direction. In this way, the travelling wave can repel the particulate(s) from the porous filter substrate 110 and move the particulate(s) along the porous filter substrate 110 (e.g., by breaking adhesive forces or cohesive forces between the particulate(s) and the porous filter substrate 110 such as, for example, due to electrostatics or Van der Waal forces).

As shown in FIG. 1, the particulate filter 100 can include a particulate collection receptacle 126 at a periphery of the porous filter substrate 110. The particulate collection receptacle 126 can be configured to collect the particulate(s) removed from the porous filter substrate 110 by the electric field. For example, the particulate collection receptacle 126 can be located along a pathway of the particulate(s) as the traveling wave of the electric field moves the particulate(s) in the second direction. In this way, the electric field generated by the conductors 120 can cause the particulate(s) to separate the particulate(s) from the porous filter substrate 110 and move the particulate(s) into the particulate collection receptacle 126.

In some examples, the particulate collection receptacle 126 can be removably coupled to the porous filter substrate 110 and/or the frame 116 of the particulate filter 100. This can facilitate rapidly and efficiently cleaning the particulate filter 100 by decoupling the particulate collection receptacle 126 for cleaning the particulate(s) from the particulate collection receptacle 126 and then re-coupling the particulate collection receptacle 126 afterwards.

In other examples, the particulate collection receptacle 126 can be fixedly coupled to the porous filter substrate 110 and/or the frame 116. In such examples, the particulate collection receptacle 126 can still improve cleaning efficiency at least because the particulate collection receptacle 126 can help to concentrate the particulate(s) in a central location that can be more easily and rapidly cleaned than the porous filter substrate 110.

As noted above, the conductors 120, the input nodes 122, and/or the input signal source 124 can operate to generate the electric field such that a standing wave and/or a traveling wave are formed on the first surface 112 and/or the second surface 114 of the porous filter substrate 110. Accordingly, the input signal source 124 can be configured to generate the voltage signal such that the electric field forms the standing wave on the at least one of the first surface 112 or the second surface 114. Additionally or alternatively, the input signal source 124 can be configured to generate the voltage signal such that the electric field forms a traveling wave, which travels along the at least one of the first surface 112 or the second surface 114 in the second direction that is transverse to the first direction of the conductors 120.

In FIG. 1, the operation of the input signal source 124 can be controlled by a controller 128 in communication with the input signal source 124. Within examples, the controller 128 can be implemented using hardware, software, and/or firmware. For instance, the controller 128 can include one or more processors 130 and a non-transitory computer readable medium (e.g., volatile and/or non-volatile memory 132) that stores machine language instructions or other executable instructions. The instructions, when executed by the one or more processors 130, can cause the components of the particulate filter 100 (e.g., the input signal source 124) to carry out the various operations described herein. The controller 128, thus, can receive data and store the data in the memory as well.

The input signal source 124 can provide the voltage signal a plurality of voltage levels and the controller 128 can be configured to select a voltage level for the voltage signal from among the plurality of voltage levels. In one example, the input signal source 124 can provide, based on a control signal from the controller 128, the voltage signal at a voltage level between approximately 200 volts and approximately 10000 volts. In another example, the input signal source 124 can provide, based on a control signal from the controller 128, the voltage signal at a voltage level between approximately 350 volts and approximately 1200 volts.

Within examples, the controller 128 can select the voltage level and/or a waveform for the voltage signal from among the plurality of voltage levels and/or a plurality of waveforms based on a type of the particulate(s), a size of the particulate(s), a mass of the particulate(s), and/or atmospheric conditions for an environment in which the particulate filter 100 is located (e.g., gravity, temperature, and/or humidity). For instance, lunar dust (which can degrade spacesuits, degrade spacecraft systems, cause mechanical problems, obscure vision, negatively impact instrument readings, and/or impact health if inhaled) may be challenging to remove from conventional filters due to, for example, (1) lunar dust being electrically charged by solar winds and/or ultraviolet radiation due to a lack of atmosphere, (2) lunar dust having irregularly shaped and abrasive particles that may get stuck in the pores of the porous filter substrate, and/or (3) lunar dust having relatively small particle sizes. In an example, to repel particulate(s) having sizes between approximately 5 microns and approximately 400 microns in lunar conditions using conductors 120 having a thickness between approximately 0.5 microns and approximately 400 microns and a spacing between the conductors of approximately 0.3 mm to approximately 4 mm, the controller 128 can cause the input signal source 124 to provide the voltage signal (i) at a voltage between approximately 500 volts to approximately 2000 volts, (ii) a frequency between approximately 5 Hertz (Hz) and approximately 200 Hz, and (iii) as a single phase or a multi-phase signal. These parametric values can be increased by a factor of approximately 3 to approximately 5 for Earth applications to account for the effects of gravity, humidity, and other atmospheric conditions.

As another example, in one implementation the particulate filter 100 can be configured to repel lunar dust and/or Martian dust having sizes between approximately 10 microns and approximately 75 microns using the electric field generated by the conductors 120. In this example implementation, the conductors 120 can be carbon nanotube fibers having thickness of approximately 180 microns to 200 approximately 200 microns and can be spaced apart by approximately 1 mm to approximately 2 mm. Additionally, in this example implementation, the input signal source 124 can provide, based on a control signal from the controller 128, the voltage signal at a voltage level between approximately 350 volts and approximately 1200 volts to effectively repel the lunar dust and/or the Martian dust from the porous filter substrate 110.

The voltage level and/or a waveform of the voltage signal can additionally or alternatively be based on a mode of operation of the particulate filter 100. For instance, as described above, the input signal source 124 can be operated in a first mode of operation that causes the conductors 120 to generate the electric field in the form of a standing wave, and/or the input signal source 124 can be operated in a second mode of operation that causes the conductors 120 to generate the electric field in the form of a traveling wave. Within examples, the voltage signal can have a first voltage level and/or a first waveform when the input signal source 124 operates in the first mode of operation, and the voltage signal can have a second voltage level and/or a second waveform when the input signal source operates in the second mode of operation. The first voltage level can be different from the second voltage level and/or the first waveform can be different than the second waveform.

In one implementation, the controller 128 can cause the input signal source 124 to initially provide the voltage signal such that the electric field forms a standing wave to separate the particulate(s) from the porous filter substrate 110. While the electric field is applied in the form of the standing wave, the particulate(s) can levitate above the first surface 112 and/or the second surface 114 of the porous filter substrate 110. After forming the standing wave, the controller 128 can cause the input signal source 124 to change the voltage signal such that the electric field forms a travelling wave, which moves the levitating particulate(s) in the second direction away from the porous filter substrate 110 (e.g., toward the particulate collection receptacle 126).

Additionally or alternatively, the controller 128 can cause the input signal source 124 to operate in a continuous mode and/or a pulsed mode. For instance, when operating in the continuous mode, the input signal source 124 can provide the voltage signal in a continuous manner such that the electric field generated by the conductors 120 forms a barrier that inhibits the particulate(s) from reaching the porous filter substrate 110. This can thus help to reduce an amount of the particulate(s) that accumulate on the porous filter substrate 110.

When operating in the pulsed mode, the input signal source 124 can provide the voltage signal in a pulsed manner such as, for example, pulses having a duration of approximately 30 seconds to approximately 60 seconds. This can help to remove and repel the particulates that previously accumulated on the porous filter substrate 110.

As shown in FIG. 1, the particulate filter 100 can also include a sensor 134 that can measure an amount of the particulate(s) (e.g., dust) on the porous filter substrate 110. As examples, the sensor 134 can include one or more capacitive sensors and/or one or more optical sensors. The sensor 134 can be located on, embedded within, and/or located adjacent to the first surface 112 and/or the second surface 114 of the porous filter substrate 110.

The controller 128 can be in communication with the sensor 134 and the input signal source 124. In one example, the controller 128 can be configured to use the sensor signal to automatically perform a cleaning of the porous filter substrate 110. For example, the controller 128 can (i) receive, from the sensor 134, a sensor signal indicative of an amount of the particulate(s) (e.g., dust) on the porous filter substrate 110, (ii) make a determination, based on the amount of particulate(s) (e.g., dust) indicated by the sensor signal, that greater than a threshold amount of the particulate(s) have accumulated on the porous filter substrate 110, and (iii) responsive to the determination that greater than a threshold amount of the particulate(s) have accumulated on the porous filter substrate 110, cause the input signal source 124 to supply, to the plurality of input nodes 122, the voltage signal to generate the electric field and remove the particulate(s) from the porous filter substrate 110. Automatically cleaning the porous filter substrate 110 can improve operational efficiency by more efficiently, rapidly, and/or frequently cleaning the porous filter substrate 110 when such cleaning is warranted.

The controller 128 can additionally or alternatively (i) receive, from the sensor 134, a sensor signal indicative of the amount of the particulate(s) (e.g., dust) on the porous filter substrate 110, (ii) determine, based on the amount of particulate(s) (e.g., dust) indicated by the sensor signal, a value for an electrical parameter of the voltage signal, and (iii) cause the input signal source 124 to supply, to the plurality of input nodes 122, the voltage signal with the electrical parameter having the value. For instance, the electrical parameter can be related to at least one of the voltage level or the waveform (e.g., the frequency, the phase(s), and/or pulse width) of the voltage signal. In an example, the controller 128 can iteratively perform the steps of receiving the sensor signal from the sensor 134, determining the electrical parameter and causing the input signal source 124 to supply the voltage signal with the electrical parameter having the value. This can help to change the voltage level and/or the waveform (e.g., the frequency, the phase(s), and/or pulse width) responsive to changes in the amount of the particulate(s) on the porous filter substrate 110.

In one implementation in which the electrical parameter includes the voltage value, the voltage value determined by the controller 128 can increase as the amount of the particulate(s) measured by the sensor 134 increases (i.e., a relatively large voltage can be applied when the sensor 134 measures a relatively large amount of particulate(s) on the porous filter substrate 110 and a relatively low voltage can be applied when the sensor 134 measures a relatively small amount of particulate(s) on the porous filter substrate 110). For instance, in one example, the controller 128 can perform a comparison of the amount of the particulate(s) measured by the sensor 134 to a threshold value. Responsive to the controller 128 determining, based on the comparison, that the amount of the particulate(s) measured by the sensor 134 is greater than the threshold value, the controller 128 can cause the input signal source 124 to supply, to the plurality of input nodes 122, the voltage signal with a first voltage value. Whereas, responsive to the controller 128 determining, based on the comparison, that the amount of the particulate(s) measured by the sensor 134 is less than the threshold value, the controller 128 can cause the input signal source 124 to supply, to the plurality of input nodes 122, the voltage signal with a second voltage value. In this example, the first voltage value can be greater than the second voltage value.

Additionally, for instance, when the controller 128 activates the input signal source 124 prior to the particulate(s) settling on the porous filter substrate 110, the particulate(s) can be repelled and inhibited from reaching the porous filter substrate 110 by the input signal source 124 providing the voltage signal with a relatively low voltage level. Whereas, when the particulate(s) have already settled on the porous filter substrate 110, the particulate(s) can be repelled from the first surface 112 and/or the second surface 114 of the porous filter substrate 110 by the input signal source 124 providing the voltage signal with a relatively high AC voltage level and/or a DC voltage.

In some examples, the controller 128 can use a lookup database (e.g., stored in the memory 132) to determine the electrical parameter for the voltage signal (e.g., the type of signal waveform, frequency, voltage, phase, etc.) to use or adjust to dislodge and/or repel the particulates that is settling or settled on the porous filter substrate 110 based on input data from the sensor 134. The lookup database can include values based on the sensors or other sources that are in signal communication with the controller.

Figure 2:
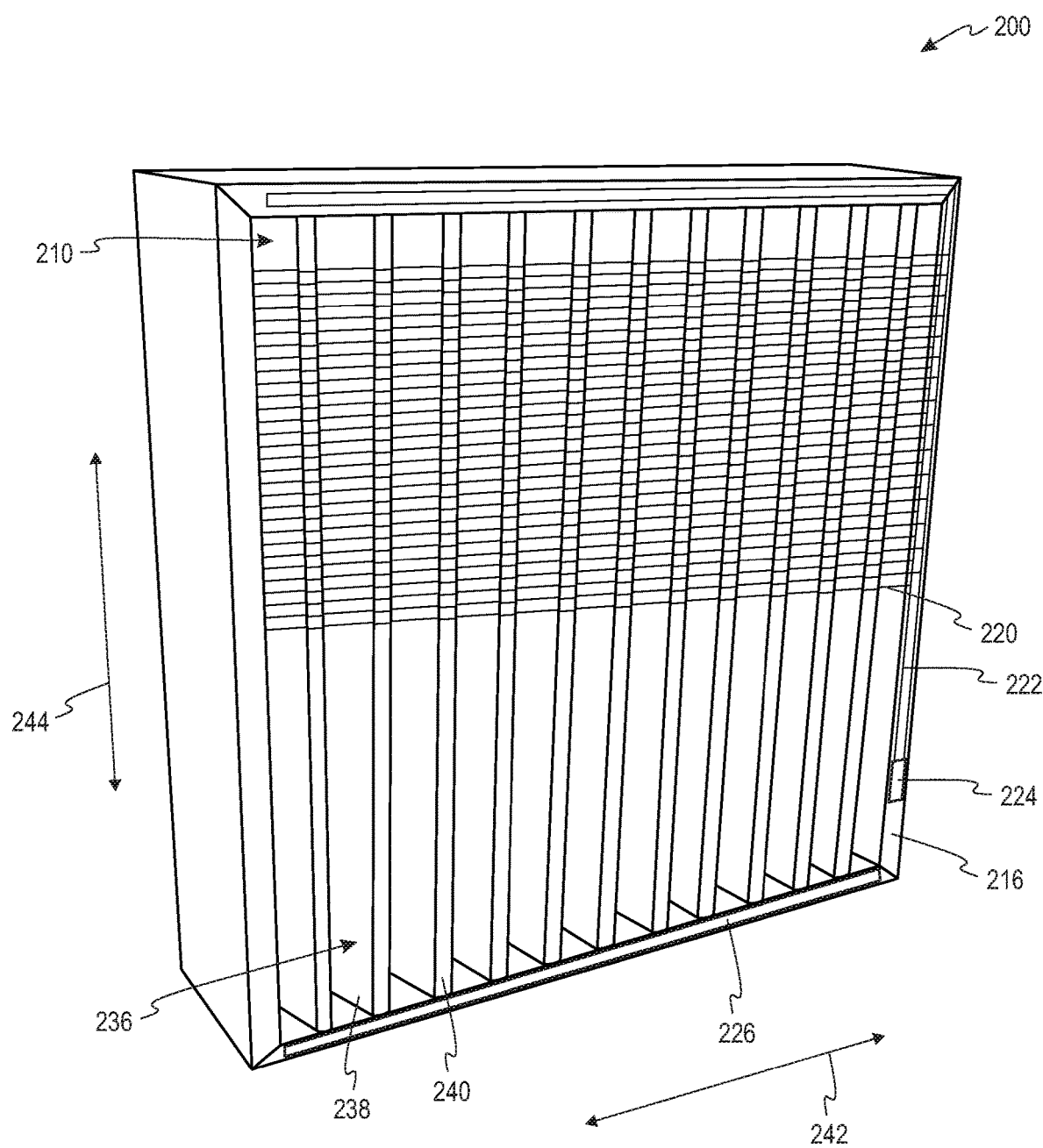
FIG. 2 depicts a perspective view of a particulate filter, according to another example.

FIGS. 2-7 depict some implementations of the particulate filter 100 according to examples. FIG. 2 depicts a particulate filter 200 that includes a porous filter substrate 210. In FIG. 2, the porous filter substrate 210 has a plurality of accordion-folded pleats 236 including a plurality of panels 238 and a plurality of fold lines 240 between respective ones of the plurality of panels 238. As noted above, providing the porous filter substrate 210 with the accordion-folded pleats 236 can help to increase a surface area of the porous filter substrate 210 for a particular height and a particular width of the porous filter substrate 210.

As shown in FIG. 2, the particulate filter 200 includes a plurality of conductors 220 that extend across the plurality of panels 238 and the plurality of fold lines 240. This can help to remove and repel the particulates from a relatively large surface area when the conductors 120 are energized, and/or to remove and repel relatively small particulates. In FIG. 2, the conductors 220 extend in a first direction 242 from a plurality of input nodes 222 that are in signal communication with an input signal source 224. Although FIG. 2 depicts the conductors 220 extending over a portion of the porous filter substrate 210 for ease of illustration (e.g., a top half of the porous filter substrate 210), the conductors 220 can extend over other portions or an entirety of the porous filter substrate 210 in other examples.

Additionally, as shown in FIG. 2, the particulate filter 200 can include a frame 216 that is coupled to and supporting the porous filter substrate 210. In FIG. 2, the frame 216 has a rectangular shape. However, the frame 216 can have a different shape in other examples. The frame 216 can also house the input signal source 224 in FIG. 2. However, the input signal source 224 can be remotely located outside of the frame 216 in other examples.

As shown in FIG. 2, the particulate filter 200 can also include a particulate collection receptacle 226 at a periphery of the porous filter substrate 210 and configured to collect the particulate(s) removed from the porous filter substrate 210 by the electric field, as described above. In FIG. 2, the particulate collection receptacle 226 can be coupled to the frame 216.

As noted above, in some instances, the input signal source 224 can generate the voltage signal such that the electric field forms a traveling wave, which travels along the at least one of the first surface or the second surface in a second direction 244 that is transverse to the first direction 242. As shown in FIG. 2, the particulate collection receptacle 226 is located along a pathway that the particulate(s) travel when moved in the second direction 244 by the traveling wave. This location of the particulate collection receptacle 226 relative to the arrangement of the conductors 220 and the second direction 244 of the traveling wave can help to efficiently collect the particulate(s) in the particulate collection receptacle 226.

Figure 3:
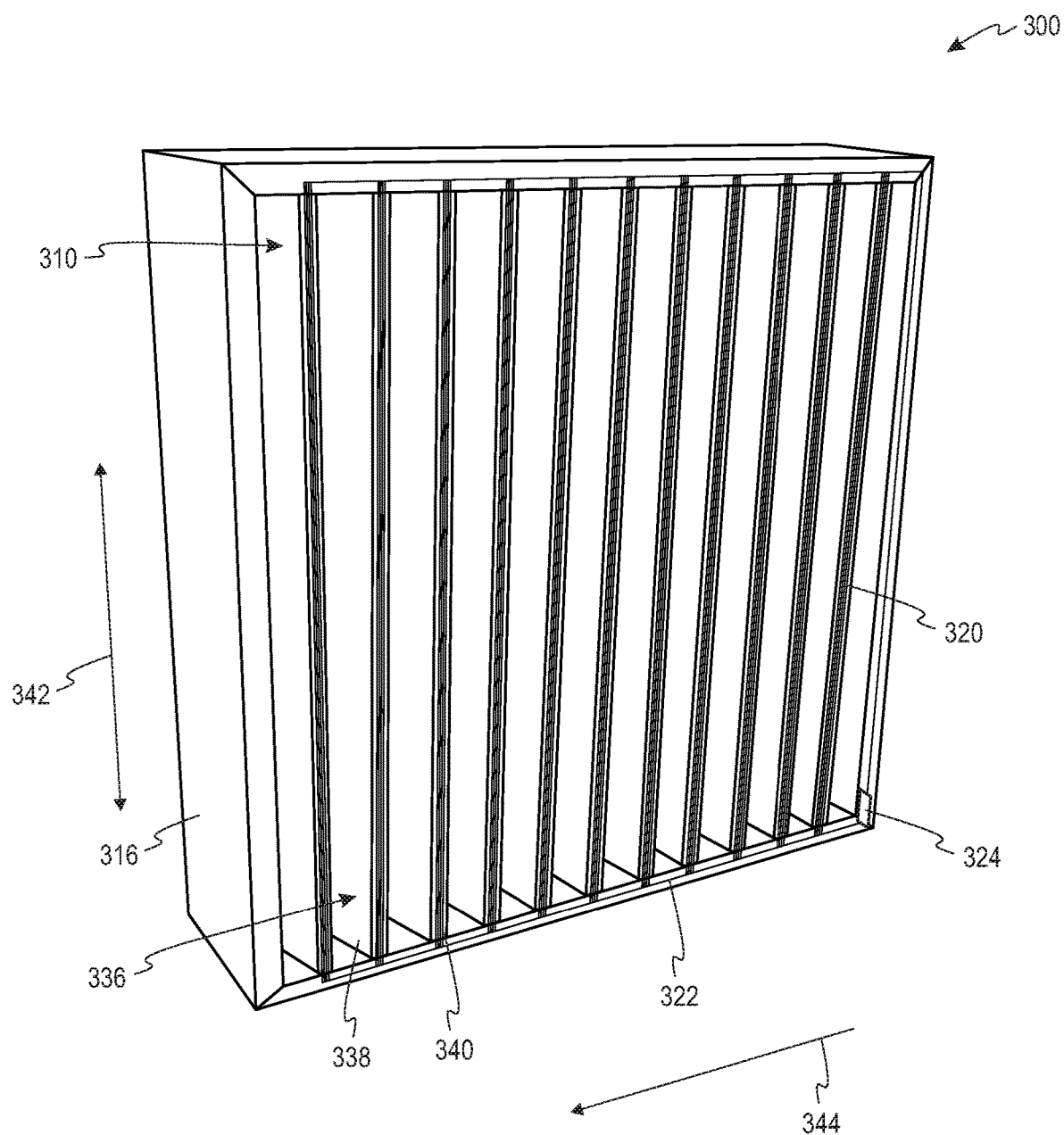
FIG. 3 depicts a perspective view of a particulate filter, according to another example.

FIG. 3 depicts a particulate filter 300 that includes a porous filter substrate 310. In FIG. 3, the porous filter substrate 310 has a plurality of accordion-folded pleats 336 including a plurality of panels 338 and a plurality of fold lines 340 between respective ones of the plurality of panels 338. As noted above, providing the porous filter substrate 310 with the accordion-folded pleats 336 can help to increase a surface area of the porous filter substrate 310 for a particular height and a particular width of the porous filter substrate 310. In FIG. 3, each conductor 320 extends along a respective fold line 340 of the plurality of fold lines 340. This can help to remove and repel relatively large particulate(s) and/or reduce costs in implementations in which a relatively small particulate load may be expected.

Additionally, as shown in FIG. 3, the particulate filter 300 can include a frame 316 that is coupled to and supporting the porous filter substrate 310. The frame 316 can house an input signal source 324 that is in signal communication with a plurality of input nodes 322, which are in signal communication with the conductors 320 and configured to receive the voltage signal from the input signal source 324.

In FIG. 3, the conductors 320 extend in a first direction 342. As noted above, in some instances, the input signal source 324 can generate the voltage signal such that the electric field forms a traveling wave, which travels along the at least one of the first surface or the second surface of the porous filter substrate 310 in a second direction 344 that is transverse to the first direction 342. Although not shown in FIG. 3, the particulate filter 300 can include a particulate collection receptacle (e.g., the particulate collection receptacle 126, 226) at a periphery of the porous filter substrate 310 (e.g., located along a pathway that the particulate(s) travel when moved in the second direction 244 by the traveling wave) to help collect the particulate(s) that are removed and/or repelled by the particulate filter 300.

Figure 4A:
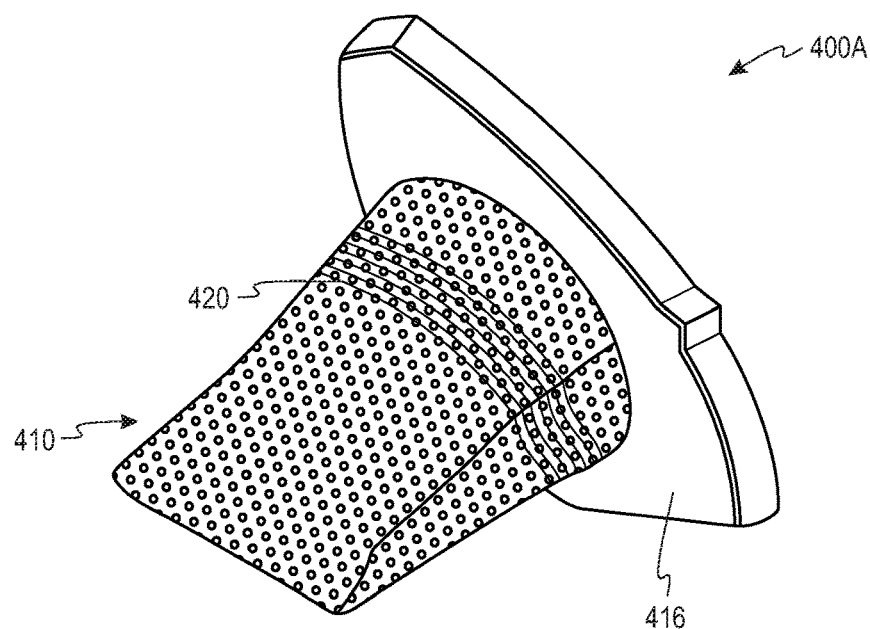
FIG. 4A depicts a perspective view of a particulate filter, according to another example.
Figure 4B:
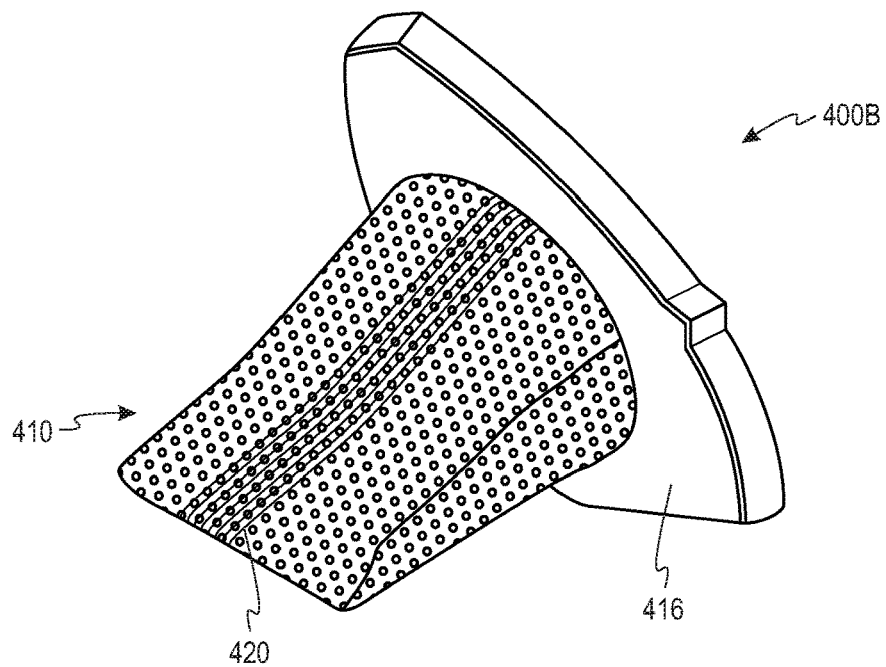
FIG. 4B depicts a perspective view of a particulate filter, according to another example.

In FIGS. 2-3, the particulate filters 200, 300 include porous filter substrates 210, 310 that have a plurality of accordion-folded pleats 236, 336. As described above, however, the porous filter substrate 110 can omit the accordion-folded pleats 236, 336 in other examples. For instance, FIGS. 4A-4B depict particulate filters 400A, 400B that each include a porous filter substrate 410 that omits the pleats. In FIG. 4A, the particulate filter 400A includes a plurality of conductors 420 extending in a lateral direction across the porous filter substrate 410. In this arrangement, the conductors 420 can form concentric circles that, when energized, can help to dislodge the particulate(s) in a direction from relatively larger circles towards relatively smaller circles (which may be generally aligned with a gravitational force in terrestrial implementations). Arranged in the concentric circles, the conductors 420 can be approximately parallel to each other. In FIG. 4B, the particulate filter 400B the conductors 420 extending in a longitudinal direction across the porous filter substrate 410. In this arrangement, the conductors 420 can be energized to remove and repel the particulate(s) in the lateral direction (i.e., transverse to a direction of the conductors 420).

Additionally, as shown in FIGS. 4A-4B, the particulate filters 400A, 400B include a frame 416 that is coupled to and supporting the porous filter substrate 410. In these examples, the frame 416 is coupled to a single end of the porous filter substrate 410 and helps to define an opening at the end of the porous filter substrate 410 through which the gas can flow. However, as described above, the particulate filters 440A, 440B can omit the frame 416 in other examples (e.g., in implementations in which the porous filter substrate 410 is self-supporting).

Referring now to FIG. 5, a cross-sectional view of a particulate filter 500 is shown according to another example. In FIG. 5, the particulate filter 500 includes a porous filter substrate 510, and a frame 516 coupled to and supporting the porous filter substrate 510. Additionally, in FIG. 5, the porous filter substrate 510 includes a plurality of filter media 546A-546F arranged in parallel planes between a first surface 512 of the porous filter substrate 510 and a second surface 514 of the porous filter substrate 510. The filter media 546A-546F can be formed from a material that is the same or similar to the materials described above with respect to the porous filter substrate 110. For example, the filter media 546A-546F can be formed of a paper material (e.g., TYVEK®), a woven fabric, a non-woven fabric, a fibrous material, an elastomer, a flexible material, an inflexible material, and/or a porous film. More generally, the filter media 546A-546F can include one or more materials that define a plurality of pores between the first surface 512 and the second surface 514, and a size of the pores can affect a rate of flow of the gas through the porous filter substrate 510 and an extent to which the porous filter substrate 510 captures the particulate(s) Providing a plurality of filter media 546A-546F between the first surface 512 and the second surface 514 can help to define a tortuous path through which the gas and the particulate(s) flow through the porous filter substrate 510, which can help to improve filtering effectiveness.

In some implementations, the filter media 546A-546F can all be formed from a common type of material. This may be beneficial, for instance, in implementations in which the porous filter substrate 510 is configured to capture a particular type of particulate, and/or multiple types of particulates that have relatively similar particle sizes. In other implementations, at least one of the filter media 546A-546F can be formed from a material that is different from a material from which at least another one of the filter media 546A-546F is formed. This may be beneficial, for instance, in implementations in which the porous filter substrate 510 is configured to capture a plurality of different types of particulates having a plurality of different particle sizes.

As shown in FIG. 5, the particulate filter 500 also includes a plurality of conductors 520 coupled to the porous filter substrate 510 in a manner similar to that described above with respect to the conductors 120 coupled to the porous filter substrate 110 (e.g., by weaving, screen printing, and/or stamping the conductors 520 on the porous filter substrate 510). In particular, the plurality of conductors 520 are coupled to the filter media 546A-546F of the porous filter substrate 510. For instance, in FIG. 5, the plurality of conductors 520 are coupled to a filter medium 546A of the plurality of filter media 546, which defines the first surface 512 of the porous filter substrate 510. Also, in FIG. 5, the plurality of conductors can be coupled to a filter medium 546F that defines the second surface 514 of the porous filter substrate 510 and/or a filter medium 546C located between the first surface 512 and the second surface 514 of the porous filter substrate 510.

Although the conductors 520 are coupled to the filter media 546A, 546C and 546F in FIG. 5, the conductors 520 can be coupled to different ones of the filter media 546A-

546F in other examples. For instance, the conductors 520 can be coupled to any combination or permutation of the filter media 546A-546F based on one or factors such as, for example, a type of particulate(s) the filter media 546A-546F is configured to capture, a quantity of the filter media 546A-546F, and/or relative positions of the filter media 546A-546F in the porous filter substrate 510. Additionally, although the porous filter substrate 510 includes six filter media 546A-546F in FIG. 5, the porous filter substrate 510 can include a lesser quantity or a greater quantity of filter media 546A-546F in other examples. For instance, the porous filter substrate 510 can include a lesser quantity of filter media 546A-546F to provide for relatively greater air flow, or the porous filter substrate 510 can include a greater quantity of filter media 546A-546F to increase a filtering capabilities of the porous filter substrate 510 (i.e., to capture a greater quantity of particulates).

Figure 6:
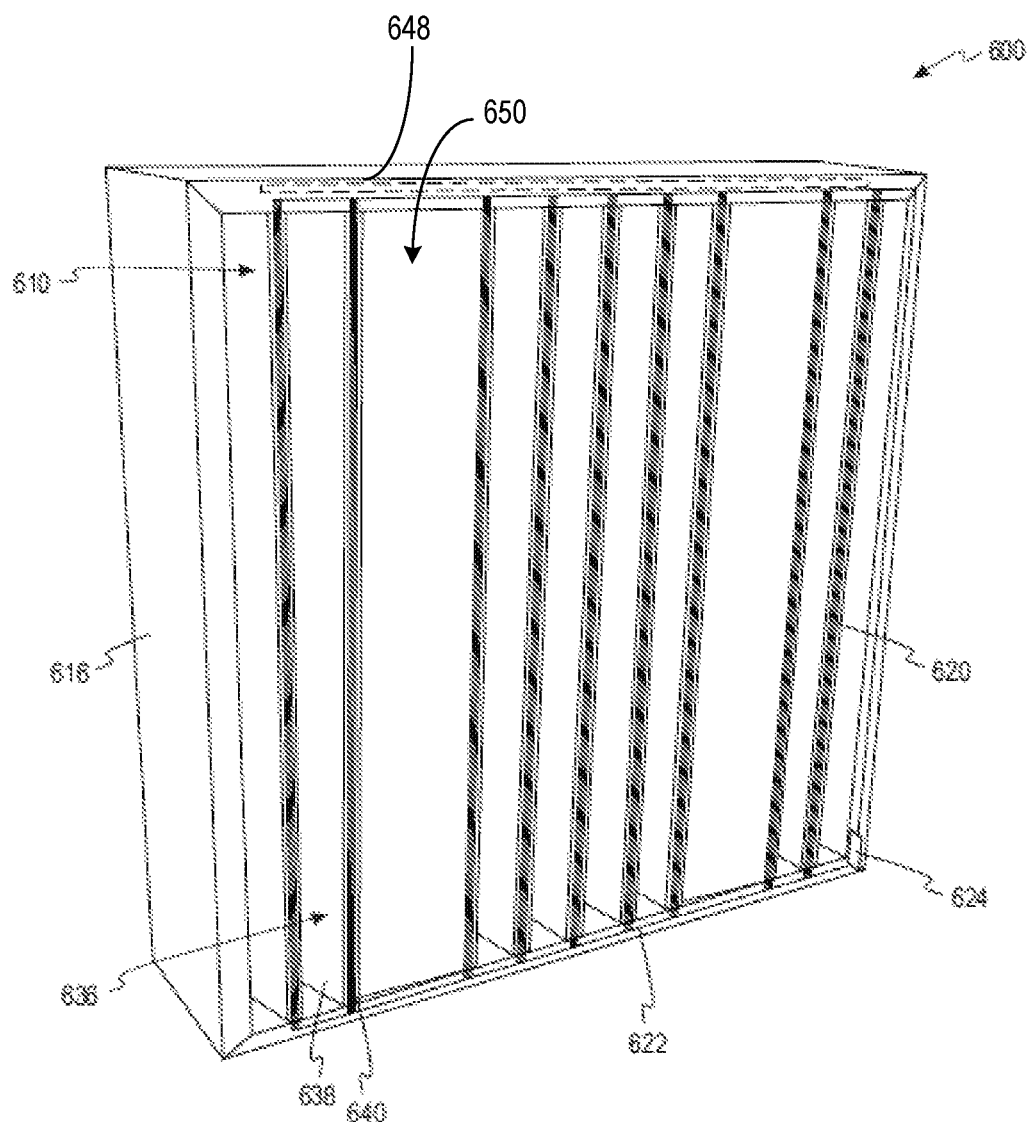
FIG. 6 depicts a perspective view of a particulate filter including an actuator, according to an example.

Referring now to FIG. 6, a particulate filter 600 is shown according to another example. In FIG. 6, the particulate filter 600 includes a porous filter substrate 310 that has a plurality of accordion-folded pleats 636 including a plurality of panels 638 and a plurality of fold lines 640 between respective ones of the plurality of panels 638. In FIG. 6, each conductor 620 extends along a respective fold line 640 of the plurality of fold lines 640, as described above with respect to FIG. 3.

The particulate filter 600 can also include a frame 616 that is coupled to and supporting the porous filter substrate 610. The frame 616 can house an input signal source 624 that is in signal communication with a plurality of input nodes 622, which are in signal communication with the conductors 620 and configured to receive the voltage signal from the input signal source 624.

In FIG. 6, the particulate filter 600 also includes an actuator 648 (e.g., an electromechanical actuator, a pneumatic actuator, and/or a hydraulic actuator) that is coupled to the accordion-folded pleats 636 and configured to adjust a shape of the porous filter substrate 610 from a first shape to a second shape. For instance, the actuator 648 can be operated to move one or more of the accordion-folded pleats 636 relative to at least one other one of the accordion-folded pleats 636 (and/or the frame 616). For example, in FIG. 6, the actuator 648 has moved the accordion-folded pleats 636 to open and expose a region 650 between a pair of adjacent accordion-folded pleats 636 (i.e., the porous filter substrate 610 is in the second shape in FIG. 6). While the accordion-folded pleats 636 are opened in this manner, the conductors 620 can generate the electric field to repel and/or remove the particulate(s). Opening the accordion-folded pleats 636 using the actuator 648 can help to improve cleaning efficiency.

In some implementations, the actuator 648 can iteratively open and close each pair of adjacent accordion-folded pleats 636 and apply the electric field to perform a cleaning cycle. In some examples, the actuator 648 can also be in communication with the controller 128 shown in FIG. 1, and the controller 128 can be operable to control operation of the actuator 648. For instance, the controller 128 can be configured to operate the actuator 648 to open the accordion-folded pleats 636 and, while the accordion-folded pleats 636 are opened, the controller 128 can cause the input signal source 624 to provide the voltage signal to the conductors 620, as described above.

As noted above, the conductors 120 can be coupled to the first surface 112 and/or the second surface 114 of the porous filter substrate 110 by weaving, screen printing, and/or stamping. As examples, FIGS. 7A-7D depict cross-sectional views of a plurality of conductors 720A-720D coupled to respective porous filter substrates 710A-710D according to examples.

Figure 7A:
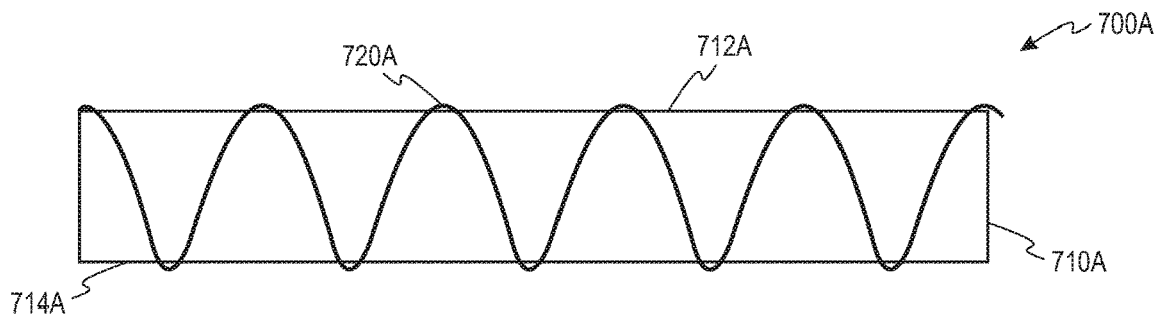
FIG. 7A depicts a cross-sectional view of a particulate porous filter substrate and a conductor, according to an example.

In FIG. 7A, the conductors 720A include a plurality of conductive fibers woven into the porous filter substrate 710A. In particular, the conductors 720A are woven into the porous filter substrate 710A such that the conductors 720A are extend to (and/or through) a first surface 712A and a second surface 714A of the porous filter substrate 710A. As such, the conductors 720A can generate the electric field at both the first surface 712A and the second surface 714A of the porous filter substrate 710A. This can help to repel and/or remove the particulate(s) on both the first surface 712A and the second surface 714A of the porous filter substrate 710A.

Figure 7B:
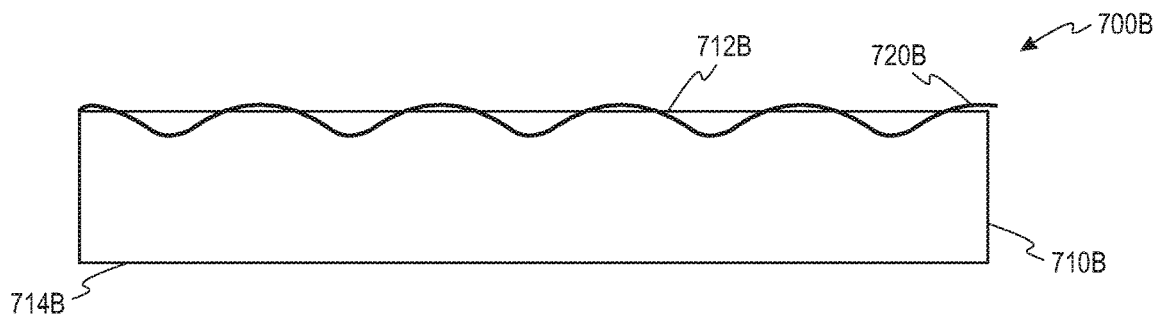
FIG. 7B depicts a cross-sectional view of a particulate porous filter substrate and a conductor, according to another example.

In FIG. 7B, the conductors 720B also include a plurality of conductive fibers woven into the porous filter substrate 710B. However, in FIG. 7B, the conductors 720B extend to (and/or through) a first surface 712B, but the conductors 720B do not extend to a second surface 714B of the porous filter substrate 710B. As such, the conductors 720B can generate the electric field the first surface 712B, but not at the second surface 714B of the porous filter substrate 710B. This can help to repel and/or remove the particulate(s) on the first surface 712B.

Figure 7C:
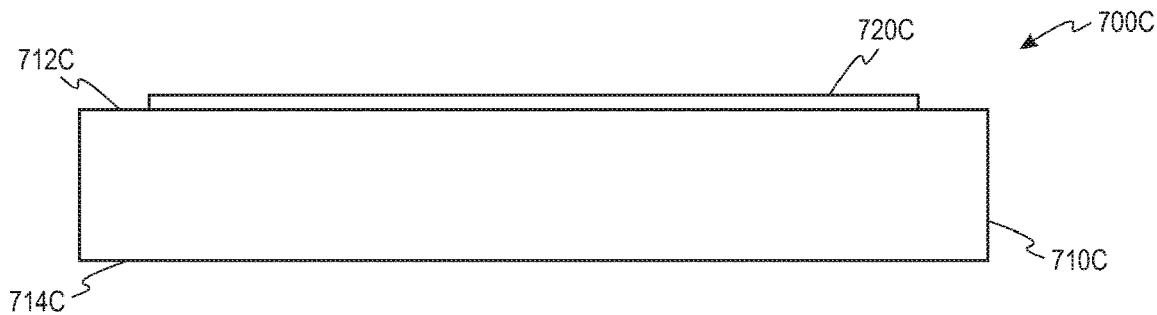
FIG. 7C depicts a cross-sectional view of a particulate porous filter substrate and a conductor, according to another example.

In FIGS. 7A-7B, the conductors 720A, 720B include conductive fibers woven into the porous filter substrate 710A, 710B. However, as described above, the conductors can additionally or alternatively include a conductive material printed on at least one of a first surface of the porous filter substrate or the second surface of the porous filter substrate. In FIG. 7C, the conductors 720C include a conductive material printed on a first surface 712C of the porous filter substrate 710C, but not on a second surface 714C of the porous filter substrate 710C. As such, the conductors 720C can generate the electric field the first surface 712C, but not at the second surface 714C of the porous filter substrate 710C. This can help to repel and/or remove the particulate(s) on the first surface 712C.

Figure 7D:
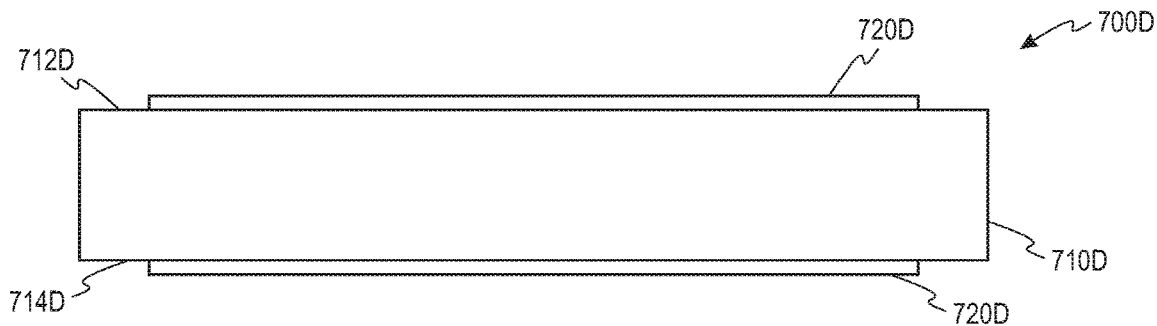
FIG. 7D depicts a cross-sectional view of a particulate porous filter substrate and a conductor, according to another example.

In FIG. 7D, the conductors 720D include a conductive material printed on a first surface 712D and a second surface 714D. As such, the conductors 720D can generate the electric field at both the first surface 712D and the second surface 714D of the porous filter substrate 710D. This can help to repel and/or remove the particulate(s) on both the first surface 712D and the second surface 714D of the porous filter substrate 710D.

Figure 8:
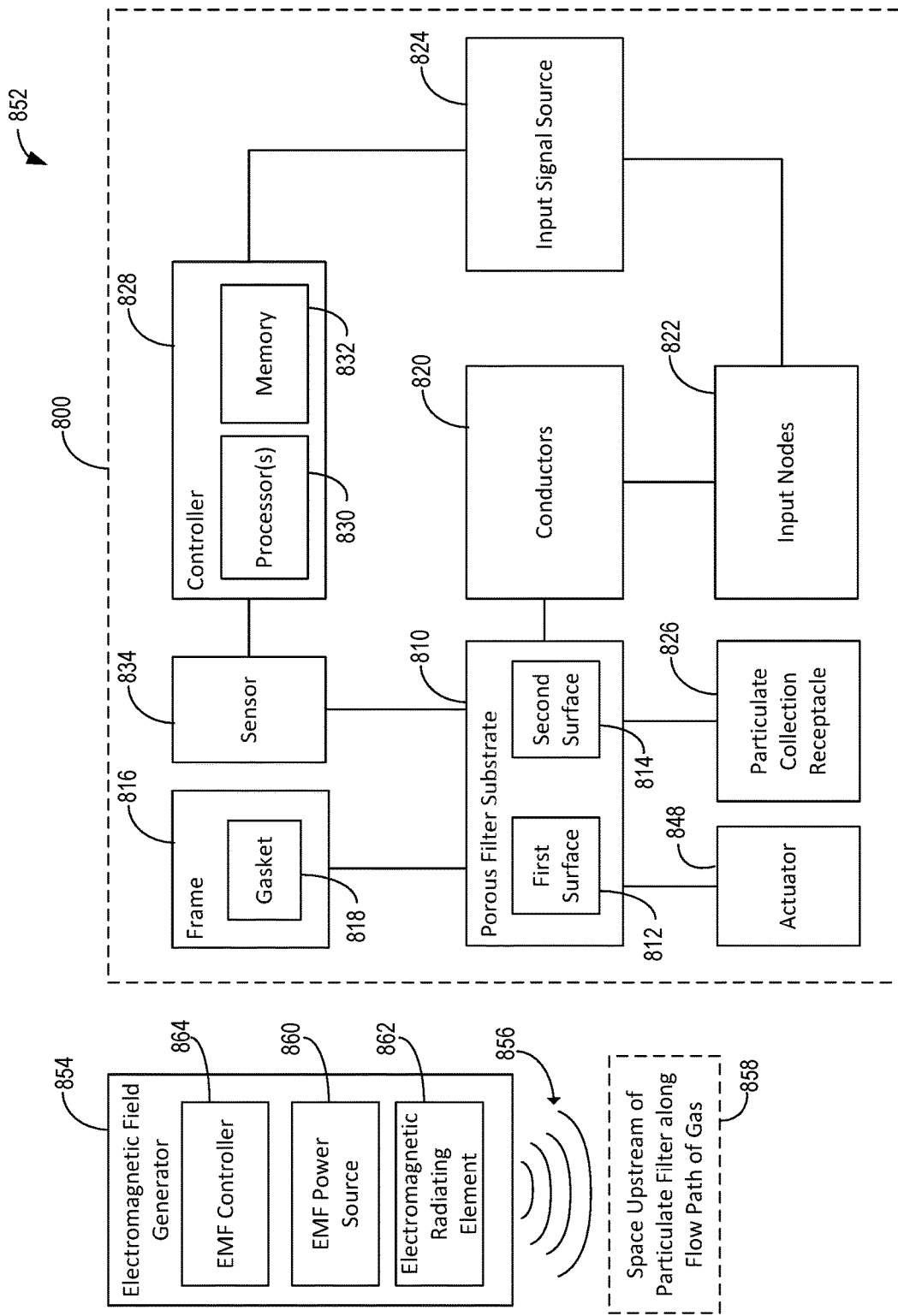
FIG. 8 depicts a simplified block diagram of a filter system, according to an example.

Referring now to FIG. 8, a simplified block diagram of a filter system 852 is shown according to an example. As shown in FIG. 8, the filter system 852 includes a particulate filter 800 and an electromagnetic field generator 854. The particulate filter 800 can be similar or identical to the particulate filters 100, 200, 300, 400, 500, 600 shown and described above with respect to FIGS. 1-6. For example, the particulate filter 800 can include a porous filter substrate 810, which includes a first surface 812 and a second surface 814. As described above, the porous filter substrate 810 is configured to filter a gas flowing through the porous filter substrate 810 between the first surface 812 and the second surface 814.

The particulate filter 800 can also include a plurality of conductors 820 coupled to the porous filter substrate 810. The conductors 820 can be approximately parallel to each other along the porous filter substrate 810. Additionally, the particulate filter 800 can include a plurality of input nodes 822 in signal communication with the plurality of conductors 820 and configured to receive a voltage signal from an input signal source 824. The plurality of conductors 820 are configured to generate an electric field on at least one of the first surface 812 or the second surface 814 of the porous filter substrate 810 in response to the plurality of input nodes 822 receiving the voltage signal from the input signal source 824. As described above, when the electric field is generated, the electric field can repel and remove particulates accumulated on the porous filter substrate 810, and/or repel particulates to inhibit the particulates from accumulating on the porous filter substrate 810.

Within examples, the conductors 820 can be coupled to at least one surface selected from the first surface 812 of the porous filter substrate 810 and the second surface 814 of the porous filter substrate 810. For instance, as described above, the conductors 820 can be coupled to the first surface 812 and/or the second surface 814 of the porous filter substrate 810 by weaving, screen printing, and/or stamping as described above and as shown, for instance, in FIGS. 7A-7D. Thus, in one implementation, the conductors 820 can include a plurality of conductive fibers woven into the porous filter substrate 810.

The particulate filter 800 can additionally include any other feature of the particulate filters 100, 200, 300, 400, 500, 600 described above, and/or shown in FIGS. 1-7. For instance, the particulate filter 800 can include a frame 816 to help provide structural rigidity to a periphery of the particulate filter 800 in some implementations, or the particulate filter 800 can omit the frame 816 in other implementations in which the porous filter substrate 810 is self-supporting. Additionally, for instance, the particulate filter 800 can include a gasket 818 for sealing the interface between the frame 816 and the porous filter substrate 810, as described above.

In some examples, the particulate filter 800 can also include the input signal source 824, as described above. Accordingly, as described above, the input signal source 824 can be operated in a first mode of operation that causes the conductors 820 to generate the electric field in the form of a standing wave, and/or the input signal source 824 can be operated in a second mode of operation that causes the conductors 820 to generate the electric field in the form of a traveling wave. Therefore, in the first mode of operation, the input signal source 824 can generate a voltage signal such that the electric field forms a standing wave on at least one of the first surface 812 or the second surface 814 of the porous filter substrate 810. Whereas, in the second mode of operation, the input signal source 824 can generate the voltage signal such that the electric field forms a traveling wave. More particularly, as described above, the conductors 820 can extend in a first direction along the porous filter substrate 810, and the input signal source 824 can generate the voltage signal such that the electric field forms the traveling wave, which travels along at least one of the first surface 812 or the second surface 814 in a second direction that is transverse to the first direction.

In FIG. 8, the operation of the input signal source 824 can be controlled by a controller 828 in communication with the input signal source 824. Within examples, the controller 828 can be implemented using hardware, software, and/or firmware. For instance, the controller 828 can include one or more processors 830 and a non-transitory computer readable medium (e.g., volatile and/or non-volatile memory 832) that stores machine language instructions or other executable instructions. The instructions, when executed by the one or more processors 830, can cause the components of the particulate filter 800 (e.g., the input signal source 824) to carry out the various operations described herein. The controller 828, thus, can receive data and store the data in the memory as well.

In some examples, the particulate filter 800 can additionally or alternatively include a particulate collection receptacle 826 at a periphery of the porous filter substrate 810 and configured to collect particulates removed from the porous filter substrate 810 by the electric field, as described above. In some implementations, the particulate collection receptacle 826 can be located along a pathway of the particulate(s) as the traveling wave of the electric field moves the particulate(s) in the second direction. In this way, the electric field generated by the conductors 820 can cause the particulate(s) to separate the particulate(s) from the porous filter substrate 810 and move the particulate(s) into the particulate collection receptacle 826. As described above, the particulate collection receptacle 826 can help enhance cleaning efficiency at least because the particulate collection receptacle 826 can help to concentrate the particulate(s) in a central location that can be more easily and rapidly cleaned than the porous filter substrate 810.

Also, in some examples, the particulate filter 800 can include an actuator 848 that is operable to adjust a shape of the porous filter substrate 810 as described above with respect to FIG. 6. For instance, the actuator 848 can be operated to move one or more of accordion-folded pleats (e.g., the accordion-folded pleats 636 in FIG. 6) of the porous filter substrate 810 relative to at least one other one of the accordion-folded pleats (and/or the frame 816). As noted above, while the accordion-folded pleats are opened in this manner, the conductors 820 can generate the electric field to repel and/or remove the particulate(s). Opening the accordion-folded pleats using the actuator 848 can help to improve cleaning efficiency.

In some examples, the particulate filter 800 can include a sensor 834 that can measure an amount of the particulate(s) (e.g., dust) on the porous filter substrate 810 as described above. Additionally, as described above, the sensor 834 can be in communication with the controller 828 and the controller 828 can use a sensor signal received from the sensor 834 as a basis for (i) triggering the generation of the electric field on the conductors 820 and/or (ii) determining an electrical parameter of a voltage signal for generating the electric field on the conductors 820.

In FIG. 8, the electromagnetic field generator 854 is operable to generate an electromagnetic field 856 that is configured to electrically charge the particulates in the gas prior to the gas flowing through the porous filter substrate 810. For instance, in FIG. 8, the electromagnetic field generator 854 is operable to generate the electromagnetic field 856 in a space 858 upstream of the particulate filter 800 along a flow path of the gas (e.g., the electromagnetic field generator 854 can be positioned upstream of the particulate filter 800 along the flow path of the gas). Charging the particulates in the gas prior to the gas flowing through the porous filter substrate 810 can help to more effectively use the electric field generated by the conductors 820 of the particulate filter 800 to repel and remove particulates accumulated on the porous filter substrate 810, and/or repel particulates to inhibit the particulates from accumulating on the porous filter substrate 810.

In one example, the electromagnetic field generator 854 can include an EMF power source 860 and an electromagnetic radiating element 862. The EMF power source 860 can supply an electrical power to the electromagnetic radiating element 862, and the electromagnetic radiating element 862 can use the electrical power to radiate the electromagnetic field 856 in the space 858 upstream of the particulate filter 800. As examples, the electromagnetic radiating element 862 can include at least one element selected from an antenna, a coil, and a mesh structure formed from a conductive material.

In some implementations, the electromagnetic field generator 854 can include an EMF controller 864. In such implementations, the EMF controller 864 can operably control the EMF power source 860 and/or the electromagnetic radiating element 862 to set and/or adjust a frequency of the electromagnetic field 856, a strength of the electromagnetic field 856, and/or a radiation pattern in space of the electromagnetic field 856. In one example, the electromagnetic field generator 854 can generate the electromagnetic field at a frequency between approximately 1 hertz (Hz) and approximately 300 Hz.

Figure 9A:
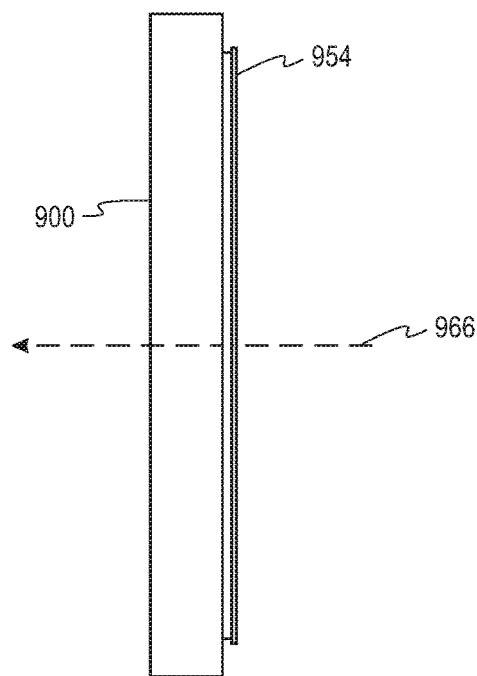
FIG. 9A depicts a side view of the filter system shown in FIG. 8, according to an example.

FIG. 9A depicts a side view of a filter system 952 according to an example implementation of the filter system 852 shown in FIG. 8. As shown in FIG. 9A, the filter system 952 includes a particulate filter 900 and an electromagnetic field generator 954, which are substantially similar or identical to the particulate filter 800 and electromagnetic field generator 854 described above. As shown in FIG. 9A, the electromagnetic field generator 954 is positioned upstream of the particulate filter 900 along a flow path 966 of the gas. In this arrangement, the electromagnetic field generator 954 is operable to generate an electromagnetic field that electrically charges the particulates in the gas prior to the gas flowing through the particulate filter 900.

Figure 9B:
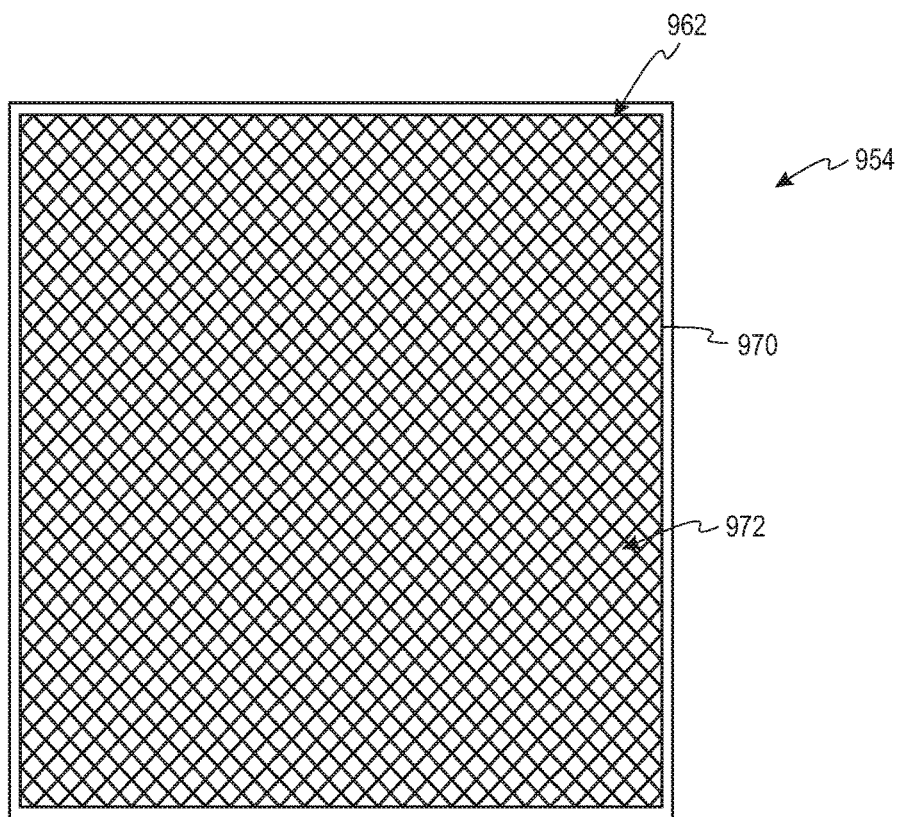
FIG. 9B depicts an electromagnetic field generator of the filter system shown in FIG. 9A, according to an example.

FIG. 9B depicts an electromagnetic radiating element of the electromagnetic field generator 954 according to an example. As shown in FIG. 9B, the electromagnetic field generator 954 includes a mesh structure 962 offset from a first surface 912 of the particulate filter 900 by a gap 968 between the electromagnetic field generator 954 and the particulate filter 900. The mesh structure 962 includes a plurality of conductive strands 970 defining a plurality of apertures 972. The apertures 972 have a size that is greater than a size of the particulates in the gas. In this arrangement, an EMF power source (e.g., the EMF power source 860) can supply an electrical power to the mesh structure 962 to cause the conductive strands 970 to radiate an electromagnetic field that can electrically charge particulates in the gas, while the apertures 972 can allow the particulates in the gas to flow through the mesh structure 962 to be filtered and/or collected by the particulate filter 900.

As noted above, the mesh structure 962 can be separated from the particulate filter 900 by the gap 968. The gap 968 between the mesh structure 962 and the particulate filter 900 can help to reduce interference between the electric field generated by the conductors (e.g., the conductors 120, 820) of the particulate filter 900 from the electromagnetic field generated by the electromagnetic field generator 954.

Figure 10:
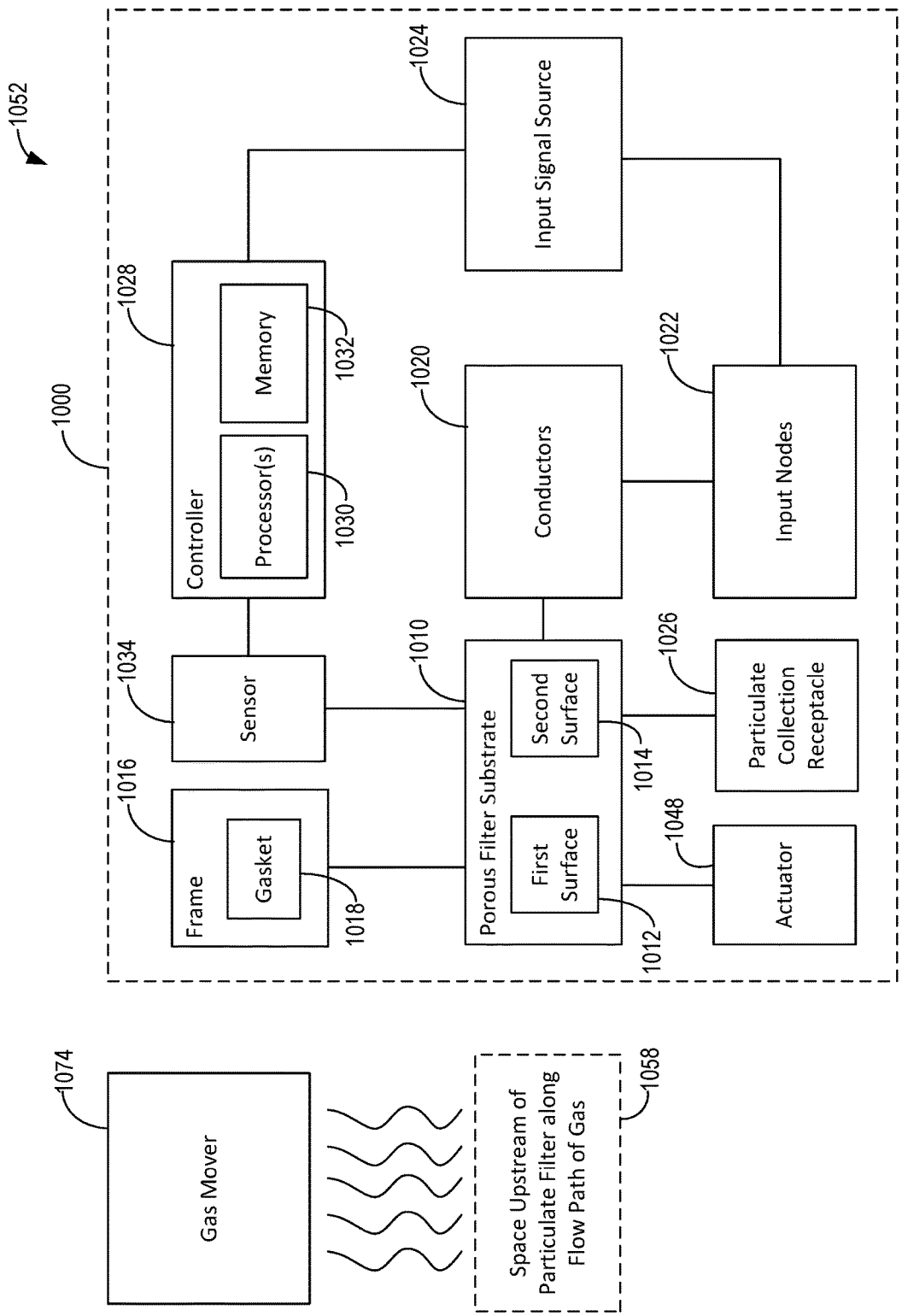
FIG. 10 depicts a simplified block diagram of a filter system, according to an example.

Referring now to FIG. 10, a simplified block diagram of a filter system 1052 is shown according to an example. As shown in FIG. 10, the filter system 1052 includes a particulate filter 1000 and a gas mover 1074. The particulate filter 1000 can be similar or identical to the particulate filters 100, 200, 300, 400, 500, 600, 800 shown and described above with respect to FIGS. 1-6 and 8-9A. For example, the particulate filter 1000 can include a porous filter substrate 1010, which includes a first surface 1012 and a second surface 1014. As described above, the porous filter substrate 1010 is configured to filter a gas flowing through the porous filter substrate 1010 between the first surface 1012 and the second surface 1014.

The particulate filter 1000 can also include a plurality of conductors 1020 coupled to the porous filter substrate 1010. The conductors 1020 can be approximately parallel to each other along the porous filter substrate 1010. Additionally, the particulate filter 1000 can include a plurality of input nodes 1022 in signal communication with the plurality of conductors 1020 and configured to receive a voltage signal from an input signal source 1024. The plurality of conductors 1020 are configured to generate an electric field on at least one of the first surface 1012 or the second surface 1014 of the porous filter substrate 1010 in response to the plurality of input nodes 1022 receiving the voltage signal from the input signal source 1024. As described above, when the electric field is generated, the electric field can repel and remove particulates accumulated on the porous filter substrate 1010, and/or repel particulates to inhibit the particulates from accumulating on the porous filter substrate 1010.

Within examples, the conductors 1020 can be coupled to at least one surface selected from the first surface 1012 of the porous filter substrate 1010 and the second surface 1014 of the porous filter substrate 1010. For instance, as described above, the conductors 1020 can be coupled to the first surface 1012 and/or the second surface 1014 of the porous filter substrate 1010 by weaving, screen printing, and/or stamping as described above and as shown, for instance, in FIGS. 7A-7D.

The particulate filter 1000 can additionally include any other feature of the particulate filters 100, 200, 300, 400, 500, 600, 800, 900 described above, and/or shown in FIGS. 1-9A. For instance, the particulate filter 1000 can include a frame 1016 to help provide structural rigidity to a periphery of the particulate filter 1000 in some implementations, or the particulate filter 1000 can omit the frame 1016 in other implementations in which the porous filter substrate 1010 is self-supporting. Additionally, for instance, the particulate filter 1000 can include a gasket 1018 for sealing the interface between the frame 1016 and the porous filter substrate 1010, as described above.

In some examples, the particulate filter 1000 can also include the input signal source 1024, as described above. Accordingly, as described above, the input signal source 1024 can be operated in a first mode of operation that causes the conductors 1020 to generate the electric field in the form of a standing wave, and/or the input signal source 1024 can be operated in a second mode of operation that causes the conductors 1020 to generate the electric field in the form of a traveling wave. Therefore, in the first mode of operation, the input signal source 1024 can generate a voltage signal such that the electric field forms a standing wave on at least one of the first surface 1012 or the second surface 1014 of the porous filter substrate 1010. Whereas, in the second mode of operation, the input signal source 1024 can generate the voltage signal such that the electric field forms a traveling wave. More particularly, as described above, the conductors 1020 can extend in a first direction along the porous filter substrate 1010, and the input signal source 1024 can generate the voltage signal such that the electric field forms the traveling wave, which travels along at least one of the first surface 1012 or the second surface 1014 in a second direction that is transverse to the first direction.

In FIG. 10, the operation of the input signal source 1024 can be controlled by a controller 1028 in communication with the input signal source 1024. Within examples, the controller 1028 can be implemented using hardware, software, and/or firmware. For instance, the controller 1028 can include one or more processors 1030 and a non-transitory computer readable medium (e.g., volatile and/or non-volatile memory 1032) that stores machine language instructions or other executable instructions. The instructions, when executed by the one or more processors 1030, can cause the components of the particulate filter 1000 (e.g., the input signal source 1024) to carry out the various operations described herein. The controller 1028, thus, can receive data and store the data in the memory as well.

In some examples, the particulate filter 1000 can additionally or alternatively include a particulate collection receptacle 1026 at a periphery of the porous filter substrate 1010 and configured to collect particulates removed from the porous filter substrate 1010 by the electric field, as described above. In some implementations, the particulate collection receptacle 1026 can be located along a pathway of the particulate(s) as the traveling wave of the electric field moves the particulate(s) in the second direction. In this way, the electric field generated by the conductors 1020 can cause the particulate(s) to separate the particulate(s) from the porous filter substrate 1010 and move the particulate(s) into the particulate collection receptacle 1026. As described above, the particulate collection receptacle 1026 can help enhance cleaning efficiency at least because the particulate collection receptacle 1026 can help to concentrate the particulate(s) in a central location that can be more easily and rapidly cleaned than the porous filter substrate 1010.

Also, in some examples, the particulate filter 1000 can include an actuator 1048 that is operable to adjust a shape of the porous filter substrate 1010 as described above with respect to FIG. 6. For instance, the actuator 1048 can be operated to move one or more of accordion-folded pleats (e.g., the accordion-folded pleats 636 in FIG. 6) of the porous filter substrate 1010 relative to at least one other one of the accordion-folded pleats (and/or the frame 1016). As noted above, while the accordion-folded pleats are opened in this manner, the conductors 1020 can generate the electric field to repel and/or remove the particulate(s). Opening the accordion-folded pleats using the actuator 1048 can help to improve cleaning efficiency.

In some examples, the particulate filter 1000 can include a sensor 1034 that can measure an amount of the particulate(s) (e.g., dust) on the porous filter substrate 1010 as described above. Additionally, as described above, the sensor 1034 can be in communication with the controller 1028 and the controller 1028 can use a sensor signal received from the sensor 1034 as a basis for (i) triggering the generation of the electric field on the conductors 1020 and/or (ii) determining an electrical parameter of a voltage signal for generating the electric field on the conductors 1020.

In FIG. 10, the gas mover 1074 is operable to generate a turbulence in the gas prior to the gas flowing through the porous filter substrate 1010. For instance, in FIG. 10, the gas mover 1074 is operable to generate the turbulence in a space 1058 upstream of the particulate filter 1000 along a flow path of the gas (e.g., the gas mover 1074 can be positioned upstream of the particulate filter 1000 along the flow path of the gas). Generating the turbulence in the gas prior to the gas flowing through the porous filter substrate 1010 can help to more effectively capture the particulates in the porous filter substrate 1010 and/or more effectively use the electric field generator by the conductors 1020 to repel and inhibit the particulates from accumulating on the porous filter substrate 1010.

In one example, the gas mover 1074 can include a fan that is positioned an oriented to blow gas (e.g., air) toward the space 1058 that is upstream of the particulate filter 1000 along the flow path of the gas. The gas blown at the space 1058 can interact with the gas flowing along the flow path to generate the turbulence in the gas flowing along the flow path towards the particulate filter 1000. In another example, the gas mover 1974 can additionally or alternatively include a compressor. This can be beneficial, for instance, in implementations in which the particulate filter 1000 is used in an air conditioned environment.

Figure 11:
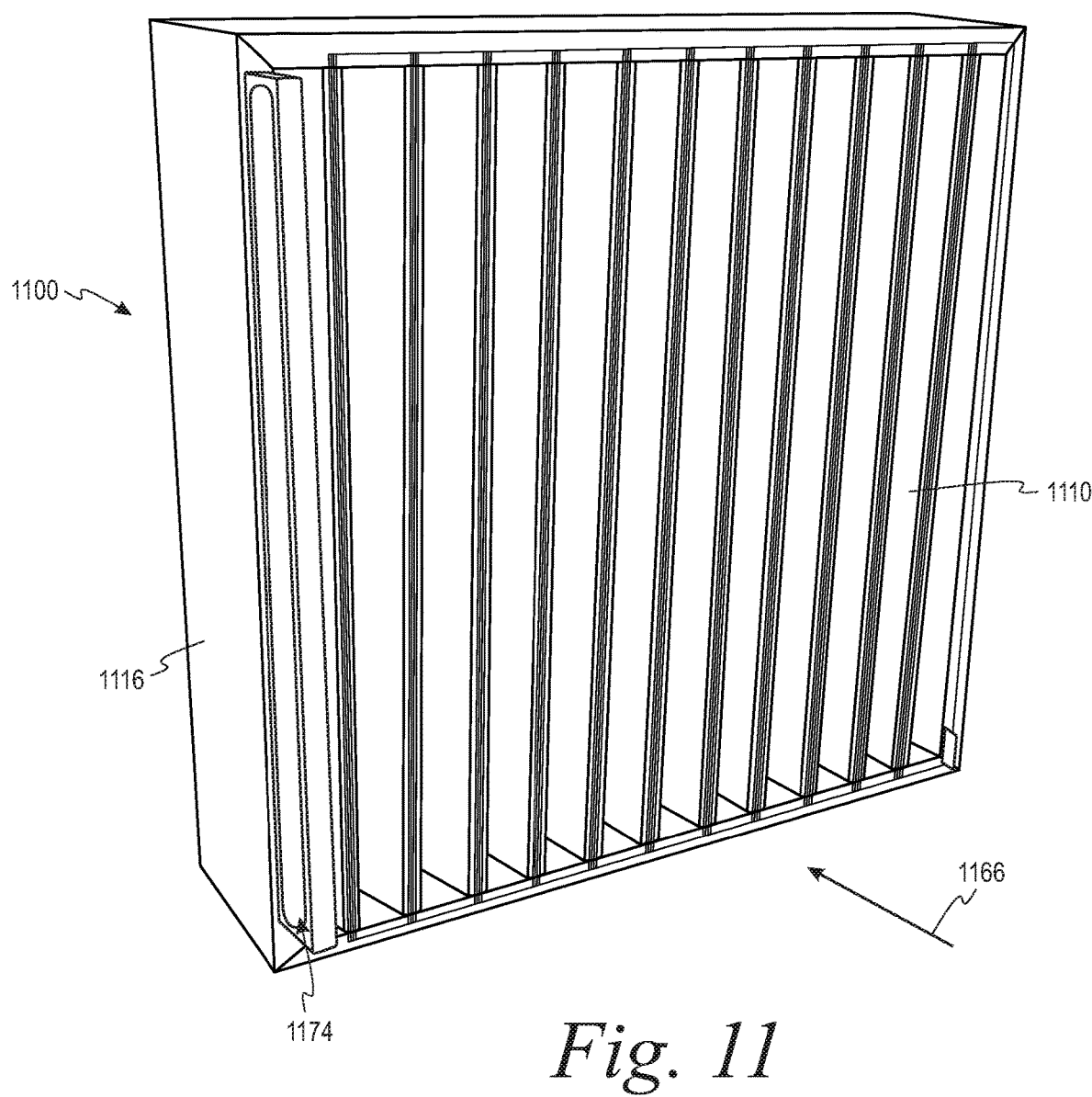
FIG. 11 depicts a perspective view of the filter system shown in FIG. 10, according to another example.

FIG. 11 depicts a side view of a filter system 1152 according to an example implementation of the filter system 1052 shown in FIG. 10. As shown in FIG. 11, the filter system 1152 includes a particulate filter 1100 and a gas mover 1174, which are substantially similar or identical to the particulate filter 1000 and the gas mover 1174 described above. As shown in FIG. 11, the gas mover 1174 is positioned upstream of the particulate filter 1100 along a flow path 1166 of the gas. In this arrangement, the gas mover 1174 is operable to direct a stream of gas into the flow path 1166 of the gas and thereby generate a turbulence in the gas prior to the gas flowing through the particulate filter 1100.

In FIG. 11, the gas mover 1174 is coupled to a frame 1116 of particulate filter 1100. This can help to maintain the gas mover 1174 and the particulate filter 1100 in fixed positions and orientations relative to each other. However, in other examples, the gas mover 1174 can be coupled to structure separate from the particulate filter 1100. This may be beneficial in an implementation in which a porous filter substrate 1110 of the particulate filter 1100 is self-supporting and omits the frame 1116.

Additionally, in FIG. 11, the gas mover 1174 is arranged relative to the particulate filter 1100 such that the gas mover 1174 can direct a stream of gas in a direction that is transverse to a direction of the flow path 1166 of the gas that flows through the particulate filter 1100. This can help to generate the turbulence in the gas that flows along the flow path 1166. In particular, in FIG. 11, the gas mover 1174 is arranged to direct the stream of gas in a direction that is perpendicular to the direction of the flow path 1166. However, the gas mover 1174 can be arranged differently relative to the particulate filter 1100 and/or the flow path 1166 in other examples.

Figure 12:
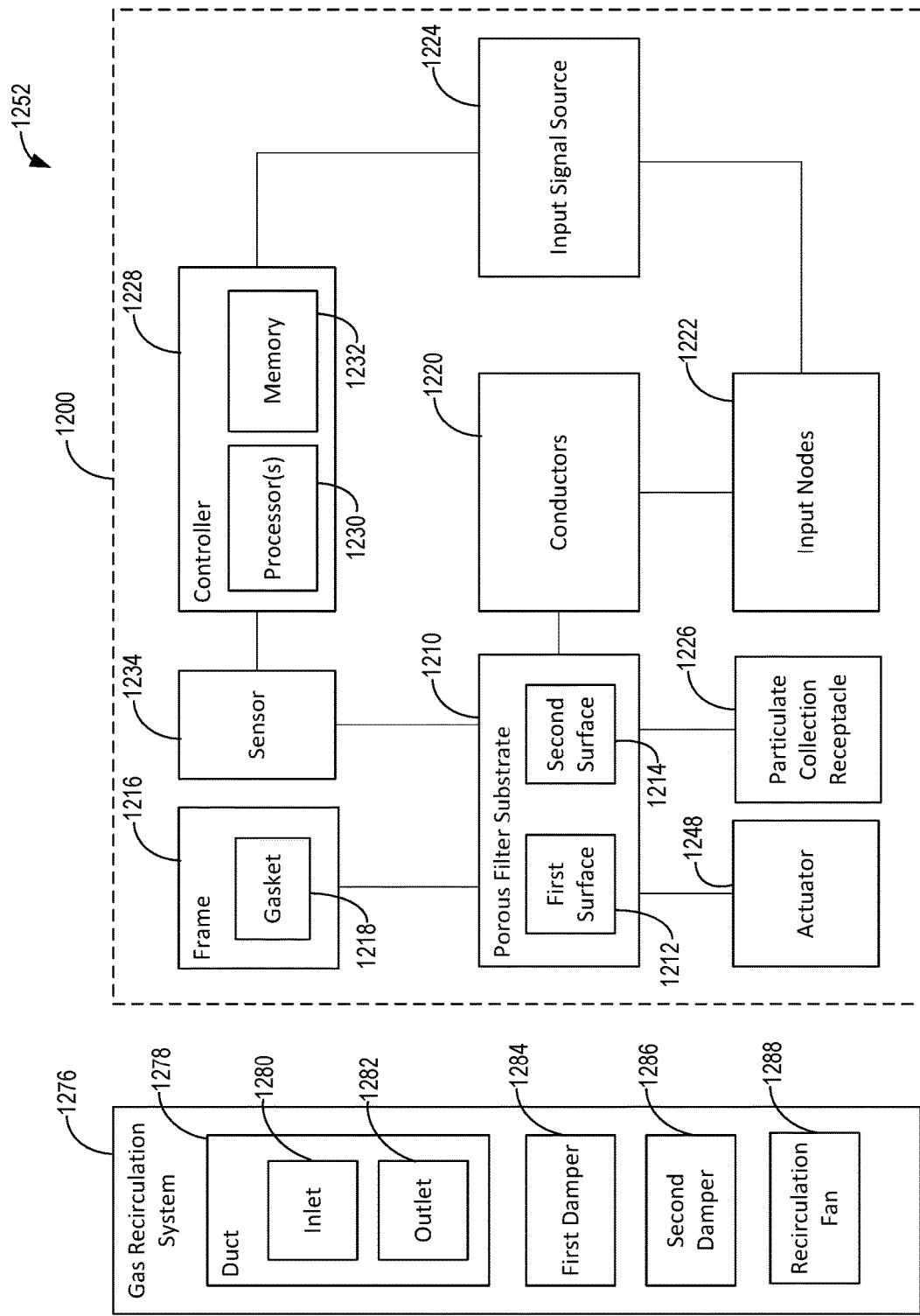
FIG. 12 depicts a simplified block diagram of a filter system, according to an example.

Referring now to FIG. 12, a filter system 1252 is shown according to an example. In particular, FIG. 12 depicts a simplified block diagram of the filter system 1252 according to an example.

As shown in FIG. 12, the filter system 1252 includes a particulate filter 1200 and a gas recirculation system 1276. The particulate filter 1200 can be similar or identical to the particulate filters 100, 200, 300, 400, 500, 600, 800, 1000 shown and described above with respect to FIGS. 1-6 and 8-11. For example, the particulate filter 1200 can include a porous filter substrate 1210, which includes a first surface 1212 and a second surface 1214. As described above, the porous filter substrate 1210 is configured to filter a gas flowing through the porous filter substrate 1210 between the first surface 1212 and the second surface 1214.

The particulate filter 1200 can also include a plurality of conductors 1220 coupled to the porous filter substrate 1210. The conductors 1220 can be approximately parallel to each other along the porous filter substrate 1210. Additionally, the particulate filter 1200 can include a plurality of input nodes 1222 in signal communication with the plurality of conductors 1220 and configured to receive a voltage signal from an input signal source 1224. The plurality of conductors 1220 are configured to generate an electric field on at least one of the first surface 1212 or the second surface 1214 of the porous filter substrate 1210 in response to the plurality of input nodes 1222 receiving the voltage signal from the input signal source 1224. As described above, when the electric field is generated, the electric field can repel and remove particulates accumulated on the porous filter substrate 1210, and/or repel particulates to inhibit the particulates from accumulating on the porous filter substrate 1210.

Within examples, the conductors 1220 can be coupled to at least one surface selected from the first surface 1212 of the porous filter substrate 1210 and the second surface 1214 of the porous filter substrate 1210. For instance, as described above, the conductors 1220 can be coupled to the first surface 1212 and/or the second surface 1214 of the porous filter substrate 1210 by weaving, screen printing, and/or stamping as described above and as shown, for instance, in FIGS. 7A-7D.

The particulate filter 1200 can additionally include any other feature of the particulate filters 100, 200, 300, 400, 500, 600, 800, 900, 1000, 1100 described above, and/or shown in FIGS. 1-11. For instance, the particulate filter 1200 can include a frame 1216 to help provide structural rigidity to a periphery of the particulate filter 1200 in some implementations, or the particulate filter 1200 can omit the frame 1216 in other implementations in which the porous filter substrate 1210 is self-supporting. Additionally, for instance, the particulate filter 1200 can include a gasket 1218 for sealing the interface between the frame 1216 and the porous filter substrate 1210, as described above.

In some examples, the particulate filter 1200 can also include the input signal source 1224, as described above. Accordingly, as described above, the input signal source 1224 can be operated in a first mode of operation that causes the conductors 1220 to generate the electric field in the form of a standing wave, and/or the input signal source 1224 can be operated in a second mode of operation that causes the conductors 1220 to generate the electric field in the form of a traveling wave. Therefore, in the first mode of operation, the input signal source 1224 can generate a voltage signal such that the electric field forms a standing wave on at least one of the first surface 1212 or the second surface 1214 of the porous filter substrate 1210. Whereas, in the second mode of operation, the input signal source 1224 can generate the voltage signal such that the electric field forms a traveling wave. More particularly, as described above, the conductors 1220 can extend in a first direction along the porous filter substrate 1210, and the input signal source 1224 can generate the voltage signal such that the electric field forms the traveling wave, which travels along at least one of the first surface 1212 or the second surface 1214 in a second direction that is transverse to the first direction.

In FIG. 12, the operation of the input signal source 1224 can be controlled by a controller 1228 in communication with the input signal source 1224. Within examples, the controller 1228 can be implemented using hardware, software, and/or firmware. For instance, the controller 1228 can include one or more processors 1230 and a non-transitory computer readable medium (e.g., volatile and/or non-volatile memory 1232) that stores machine language instructions or other executable instructions. The instructions, when executed by the one or more processors 1230, can cause the components of the particulate filter 1200 (e.g., the input signal source 1224) to carry out the various operations described herein. The controller 1228, thus, can receive data and store the data in the memory as well.

In some examples, the particulate filter 1200 can additionally or alternatively include a particulate collection receptacle 1226 at a periphery of the porous filter substrate 1210 and configured to collect particulates removed from the porous filter substrate 1210 by the electric field, as described above. In some implementations, the particulate collection receptacle 1226 can be located along a pathway of the particulate(s) as the traveling wave of the electric field moves the particulate(s) in the second direction. In this way, the electric field generated by the conductors 1220 can cause the particulate(s) to separate the particulate(s) from the porous filter substrate 1210 and move the particulate(s) into the particulate collection receptacle 1226. As described above, the particulate collection receptacle 1226 can help enhance cleaning efficiency at least because the particulate collection receptacle 1226 can help to concentrate the particulate(s) in a central location that can be more easily and rapidly cleaned than the porous filter substrate 1210.

Also, in some examples, the particulate filter 1200 can include an actuator 1248 that is operable to adjust a shape of the porous filter substrate 1210 as described above with respect to FIG. 6. For instance, the actuator 1248 can be operated to move one or more of accordion-folded pleats (e.g., the accordion-folded pleats 636 in FIG. 6) of the porous filter substrate 1210 relative to at least one other one of the accordion-folded pleats (and/or the frame 1216). As noted above, while the accordion-folded pleats are opened in this manner, the conductors 1220 can generate the electric field to repel and/or remove the particulate(s). Opening the accordion-folded pleats using the actuator 1248 can help to improve cleaning efficiency.

In some examples, the particulate filter 1200 can include a sensor 1234 that can measure an amount of the particulate(s) (e.g., dust) on the porous filter substrate 1210 as described above. Additionally, as described above, the sensor 1234 can be in communication with the controller 1228 and the controller 1228 can use a sensor signal received from the sensor 1234 as a basis for (i) triggering the generation of the electric field on the conductors 1220 and/or (ii) determining an electrical parameter of a voltage signal for generating the electric field on the conductors 1220.

In FIG. 12, the gas recirculation system 1276 includes a duct 1278 having an inlet 1280 and an outlet 1282. The inlet 1280 of the duct 1278 is configured to receive, into the duct 1278, the gas exiting the particulate filter 1200 at the second surface 1214. The outlet 1282 of the duct 1278 is configured to output the gas from the duct 1278 to the particulate filter 1200 at the first surface 1212. As such, the duct 1278 can provide a conduit for recirculating the gas from the second surface 1214 back to the first surface 1212 so that the gas can pass through the porous filter substrate 1210 a plurality of times. This can help to remove a relatively greater amount of particulates from the gas as compared to a filter system that passes the gas through the porous filter substrate 1210 a single time.

Within examples, the filter system 1252 can controllably adjust the electric field generated by the conductors 1220 on the first surface 1212 and/or the second surface 1214 while the gas is recirculated through the porous filter substrate 1210 a plurality of times. For example, the controller 1228 can: (i) cause the input signal source 1224 to provide a first voltage signal while the gas flows through the porous filter substrate 1210 a first time, and (ii) after the gas is recirculated by the gas recirculation system 1276, cause the input signal source 1224 to provide a second voltage signal while the gas flows through porous filter substrate 1210 a second time. The first voltage signal differs from the second voltage signal. Because different types of particulates can be differently affected by different types of electric fields, adjusting the electric field while recirculating the gas through the porous filter substrate 1210 can more effectively remove more diverse types of particulates from a given volume of gas than when the volume of gas is passed through the porous filter substrate 1210 a single time.

As noted above, the first voltage signal differs from the second voltage signal. In some examples, the first voltage signal has a first voltage level and a first waveform, the second voltage signal has a second voltage level and a second waveform, and the first voltage level is different than the second voltage level. In some examples, the first voltage signal has a first voltage level and a first waveform, the second voltage signal has a second voltage level and a second waveform, and the first waveform is different than the second waveform. In further examples, while the gas recirculation system 1276 recirculates the gas through the porous filter substrate 1210 N times, the controller 1228 can cause the input signal source 1224 to provide M voltage signals that differ from each other in at least one of a voltage level or a waveform, where N and M are integer values that are greater than one.

In some examples, the gas recirculation system 1276 can additionally include one or more dampers to assist in controlling a flow path of the gas in the gas recirculation system 1276. For example, the gas recirculation system 1276 can include a first damper 1284 downstream of inlet 1280 and a second damper 1286 upstream of the outlet 1282. The first damper 1284 is actuatable between a first position and a second position. When the first damper 1284 is in the first position, the first damper 1284 is configured to direct the gas from the second surface 1214 toward the inlet 1280 of the duct 1278 of the gas recirculation system 1276. When the first damper 1284 is in the second position, the first damper 1284 is configured to allow the gas to flow away from the inlet 1280 of the duct 1278 of the gas recirculation system 1276. In this arrangement, the first damper 1284 can be actuated to the first position to recirculate the gas through the particulate filter 1200, and the first damper 1284 can be actuated to the second position to exhaust the gas away from the particulate filter 1200 and out of the filter system 1252 after recirculation and filtration are completed.

The second damper 1286 can also be actuatable between a first position and a second position. When the second damper 1286 is in the first position, the second damper 1286 is configured to direct the gas from the outlet 1282 of the duct 1278 toward the first surface 1212 of the porous filter substrate 1210. When the second damper 1286 is in the second position, the second damper 1286 is configured to allow the gas to flow past the outlet 1282 of the duct 1278 to the first surface 1212 of the porous filter substrate 1210. In this arrangement, the second damper 1286 can be actuated to the second position to provide for an initial ingress of the gas into the filter system 1252 and toward the particulate filter 1200, and the second damper 1286 can be actuated to the first position to assist in recirculating the gas through the particulate filter 1200.

In some examples, the controller 1228 can be in communication with the first damper 1284 and the second damper 1286. In an implementation, the controller 1228 can actuate the second damper 1286 to the second position to allow an initial volume of gas to flow into the gas recirculation system 1276 and to the first surface 1212 of the porous filter substrate 1210. To recirculate the initial volume of gas, the controller 1228 can actuate the first damper 1284 and the second damper 1286 to the respective first positions. After passing the initial volume of gas through the porous filter substrate 1210 a plurality of times, the controller 1228 can actuate the first damper 1284 from the first position to the second position to exhaust the gas out of the filter system 1252. For instance, in an implementation in which the gas is passed through the porous filter substrate 1210 two times, the controller 1228 can actuate the first damper 1284 from the first position to the second position after the gas flows through porous filter substrate 1210 the second time. The controller 1228 can also actuate the second damper 1286 to the second position to allow for a subsequent volume of gas to flow into the filter system 1252 and the process can be repeated.

In some examples, the gas recirculation system 1276 can also include a recirculation fan 1288 that is configured to increase a flow of the gas from the inlet 1280 to the outlet 1282. In this way, the gas recirculation system 1276 can help to improve the flow of gas, which can help to more rapidly and/or efficiently recirculate and filter the gas relative to implementations that omit the recirculation fan 1288. In an example, the recirculation fan 1288 is positioned in the duct 1278 between the inlet 1280 and the outlet 1282. This may beneficially reduce or mitigate the recirculation fan 1288 inhibiting the flow of gas when the gas is being exhausted from the filter system 1252 (e.g., when the first damper 1284 is in the second position). However, in other examples, the recirculation fan 1288 can be located in a different position (e.g., external to the duct 1278).

As described above, the controller 1228 can cause the input signal source 1224 to provide a plurality of voltage signals having different electrical characteristics to generate a plurality of electric fields that can interact differently with different types of particulates in the gas. In some examples, the controller 1228 can additionally or alternatively adjust a shape of the porous filter substrate 1210 while the gas is recirculated through the porous filter substrate a plurality of times. For example, as described above, the filter system 1252 can include the actuator 1248 that can adjust a shape of the porous filter substrate 1210 from a first shape to a second shape in some implementations. The controller 1228 can be in communication with the actuator 1248, and the controller 1228 can be configured to: (i) cause the actuator 1248 to arrange the porous filter substrate 1210 in the first shape while the gas flows through the porous filter substrate 1210 the first time, and (ii) after the gas is recirculated by the gas recirculation system 1276, cause the actuator 1248 to arrange the porous filter substrate 1210 in the second shape while the gas flows through porous filter substrate the second time. This can assist in exposing the gas to different portions of the porous filter substrate 1210 during different passes through the porous filter substrate 1210, which can help to improve filtering efficiency.

In one implementation, the porous filter substrate 1210 has a plurality of accordion-folded pleats including a plurality of panels and a plurality of fold lines between respective ones of the plurality of panels (e.g., the accordion-folded pleats 636 including the panels 638 and fold lines 640 shown in FIG. 6). In this implementation, the actuator 1248 can move at least one panel of the plurality of panels relative to at least another panel of the plurality of panels to adjust the shape of the porous filter substrate 1210 from the first shape to the second shape. In implementations in which the gas is further recirculated, the controller 1228 can further cause the actuator 1248 to further adjust the shape of the porous filter substrate 1210. For instance, the controller 1228 can further cause the actuator 1248 to move at least one additional panel relative to at least another panel to further adjust the shape of the porous filter substrate 1210.

Figure 13:
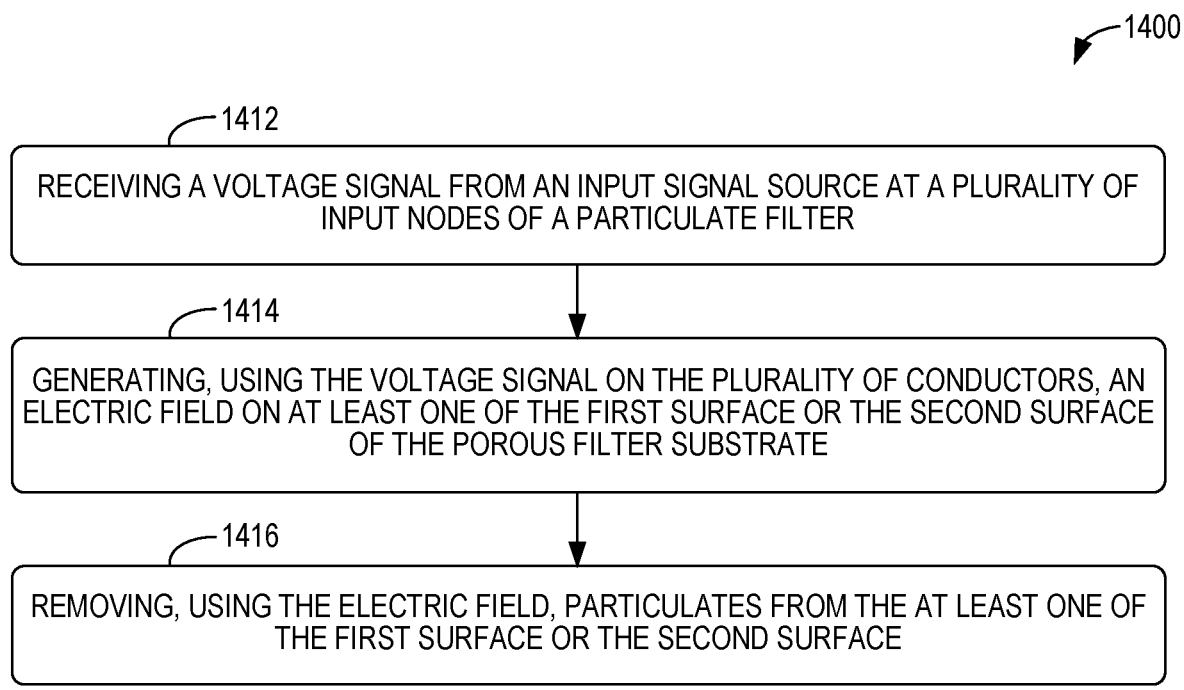
FIG. 13 depicts a flowchart for a process for removing particulates from a particulate filter, according to an example.

Referring now to FIG. 13, a flowchart for a process 1400 of removing particulates from a filter shown according to an example. As shown in FIG. 13, at block 1412, the process 1400 includes receiving a voltage signal from an input signal source at a plurality of input nodes of a particulate filter. The particulate filter includes a porous filter substrate and a plurality of conductors coupled to the porous filter substrate. The porous filter substrate is configured to filter a gas flowing between a first surface of the porous filter substrate and a second surface of the porous filter substrate. The plurality of conductors are approximately parallel to each other along the porous filter substrate. The plurality of input nodes are in signal communication with the plurality of conductors.

At block 1414, the process 1400 includes generating, using the voltage signal on the plurality of conductors, an electric field on at least one of the first surface or the second surface of the porous filter substrate. At block 1416, the process 1400 includes removing, using the electric field, particulates from the at least one of the first surface or the second surface.

Figure 14:
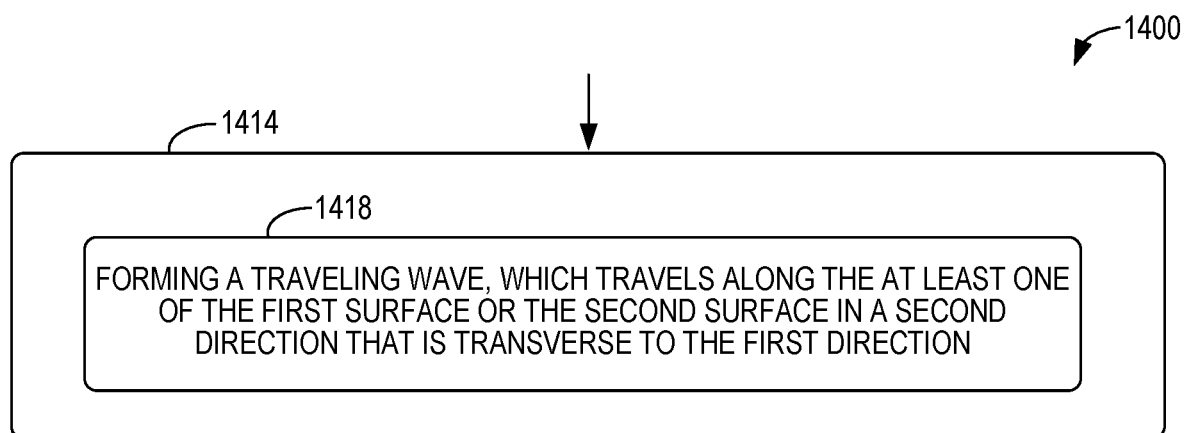
FIG. 14 depicts a flowchart for a process for removing particulates from a particulate filter for use with the process shown in FIG. 13.

FIGS. 14-20 depict additional aspects of the process 1400 according to further examples. In an example, the plurality of conductors extend in a first direction along the porous filter substrate. As shown in FIG. 14, generating, using the voltage signal on the plurality of conductors, the electric field at block 1414 can include forming a traveling wave, which travels along the at least one of the first surface or the second surface in a second direction that is transverse to the first direction at block 1418.

Figure 15:
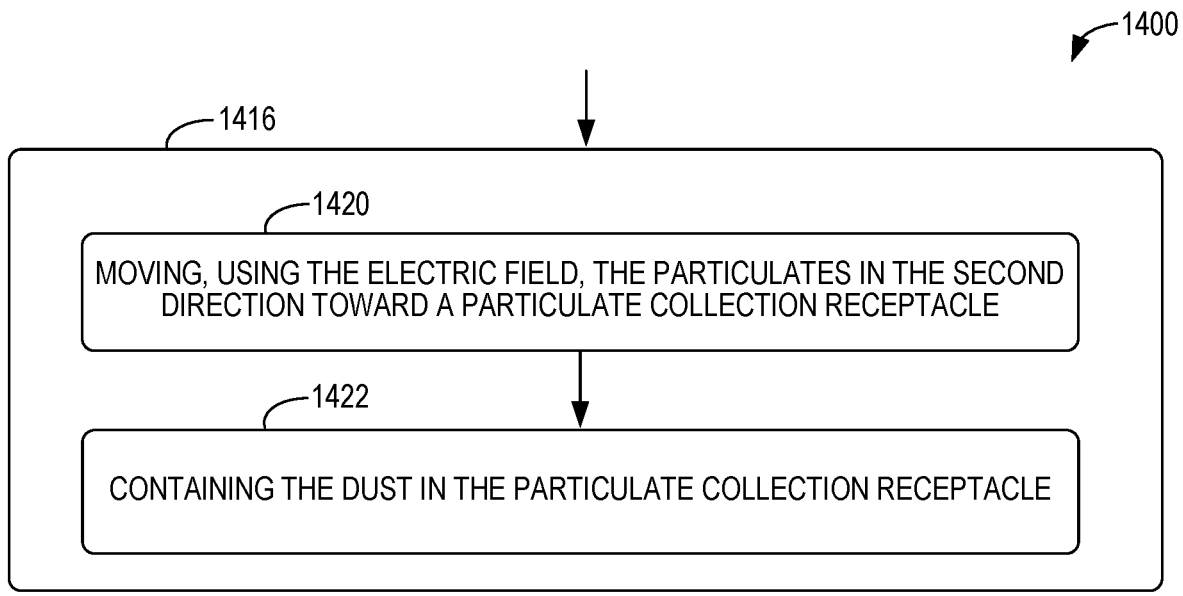
FIG. 15 depicts a flowchart for a process for removing particulates from a particulate filter for use with the process shown in FIG. 14.

As shown in FIG. 15, removing, using the electric field, the particulates from the at least one of the first surface or the second surface at block 1416 can include moving, using the electric field, the particulates in the second direction toward a particulate collection receptacle at block 1420, and containing the particulates in the particulate collection receptacle at block 1422.

Figure 16:
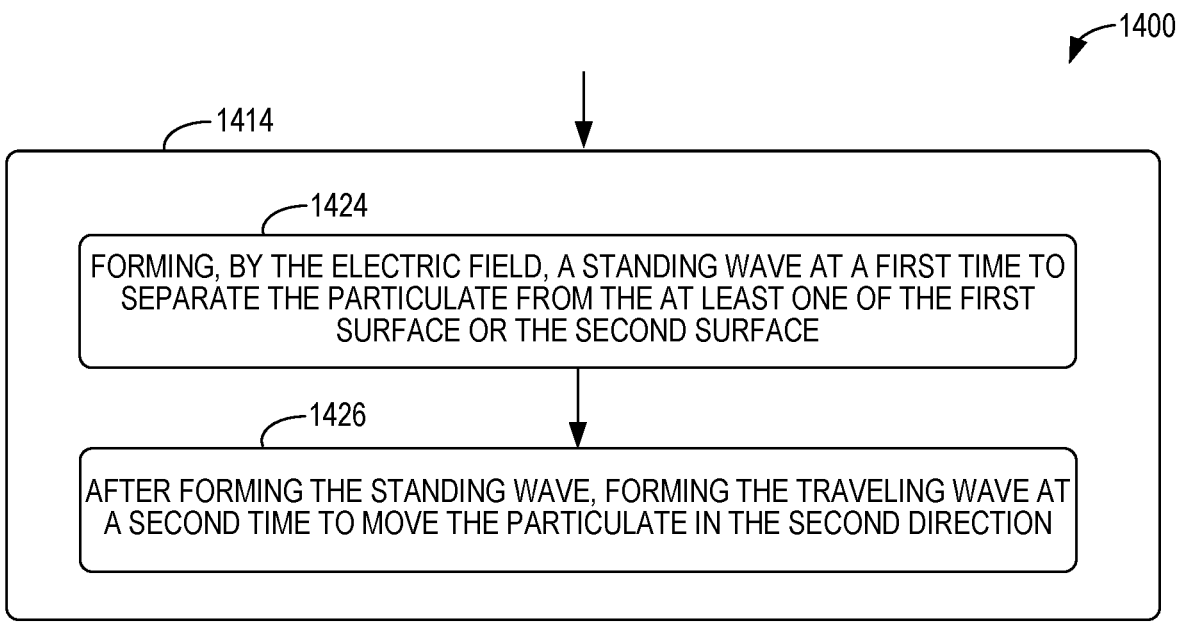
FIG. 16 depicts a flowchart for a process for removing particulates from a particulate filter for use with the process shown in FIG. 14.

As shown in FIG. 16, generating, using the voltage signal on the plurality of conductors, the electric field at block 1414 can include (i) forming, by the electric field, a standing wave at a first time to separate the particulates from the at least one of the first surface or the second surface at block 1424 and (ii) after forming the standing wave at block 1424, forming the traveling wave at a second time to move the particulates in the second direction at block 1426.

Figure 17:
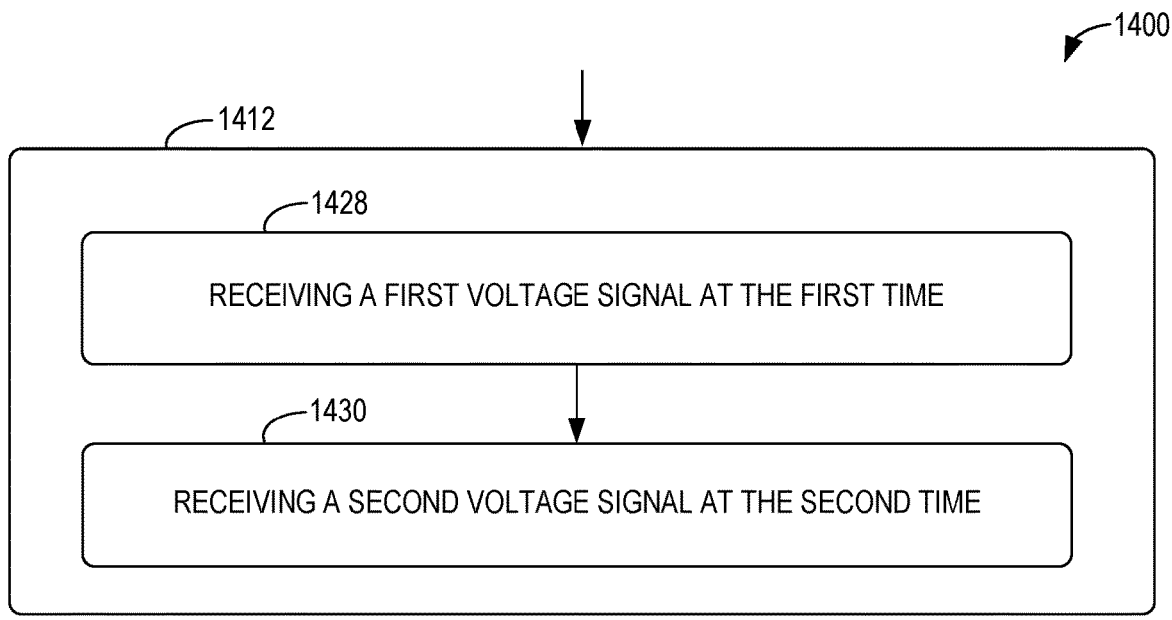
FIG. 17 depicts a flowchart for a process for removing particulates from a particulate filter for use with the process shown in FIG. 16.

As shown in FIG. 17, receiving the voltage signal from the input signal source at the plurality of input nodes at block 1412 can include receiving a first voltage signal at the first time at block 1428, and receiving a second voltage signal at the second time at block 1430. An electrical parameter of the first voltage signal can have a value that is different than a value of the electrical parameter of the second voltage signal.

Figure 18:
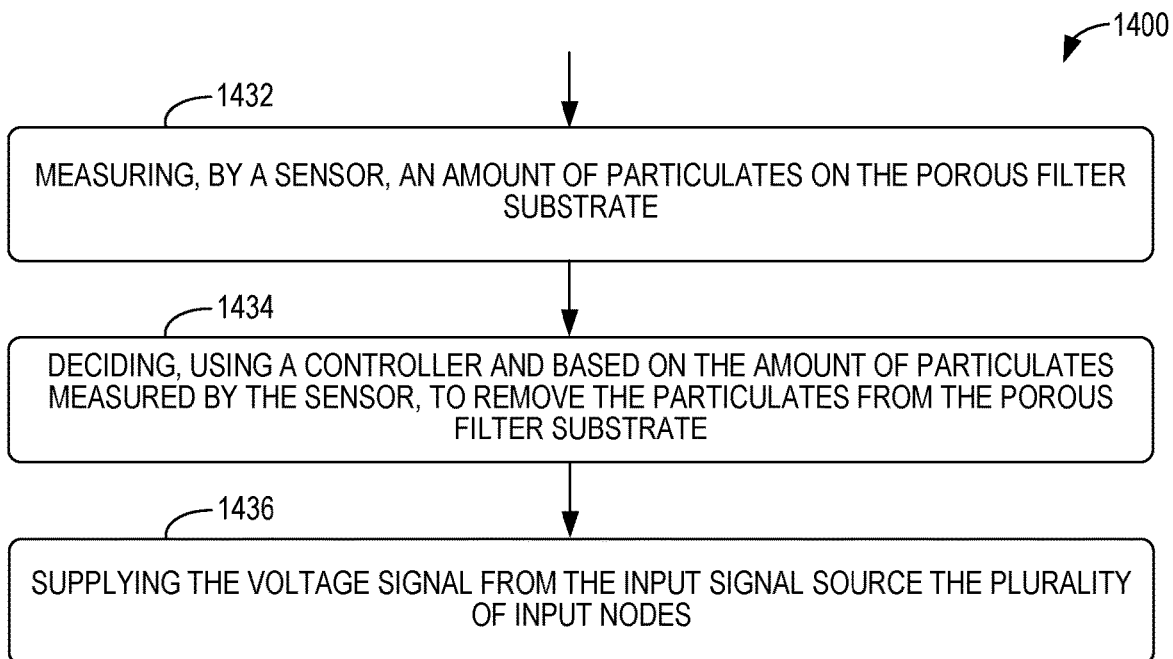
FIG. 18 depicts a flowchart for a process for removing particulates from a particulate filter for use with the process shown in FIG. 13.

As shown in FIG. 18, the process 1400 can also include measuring, by a sensor, an amount of particulates on the porous filter substrate at block 1432. In FIG. 18, the process 1400 can further include deciding, using a controller and based on the amount of particulates measured by the sensor, to remove the particulates from the porous filter substrate at block 1434. Responsive to deciding to remove the particulates from the porous filter substrate at block 1434, the process 1400 can include supplying the voltage signal from the input signal source the plurality of input nodes at block 1436.

Figure 19:
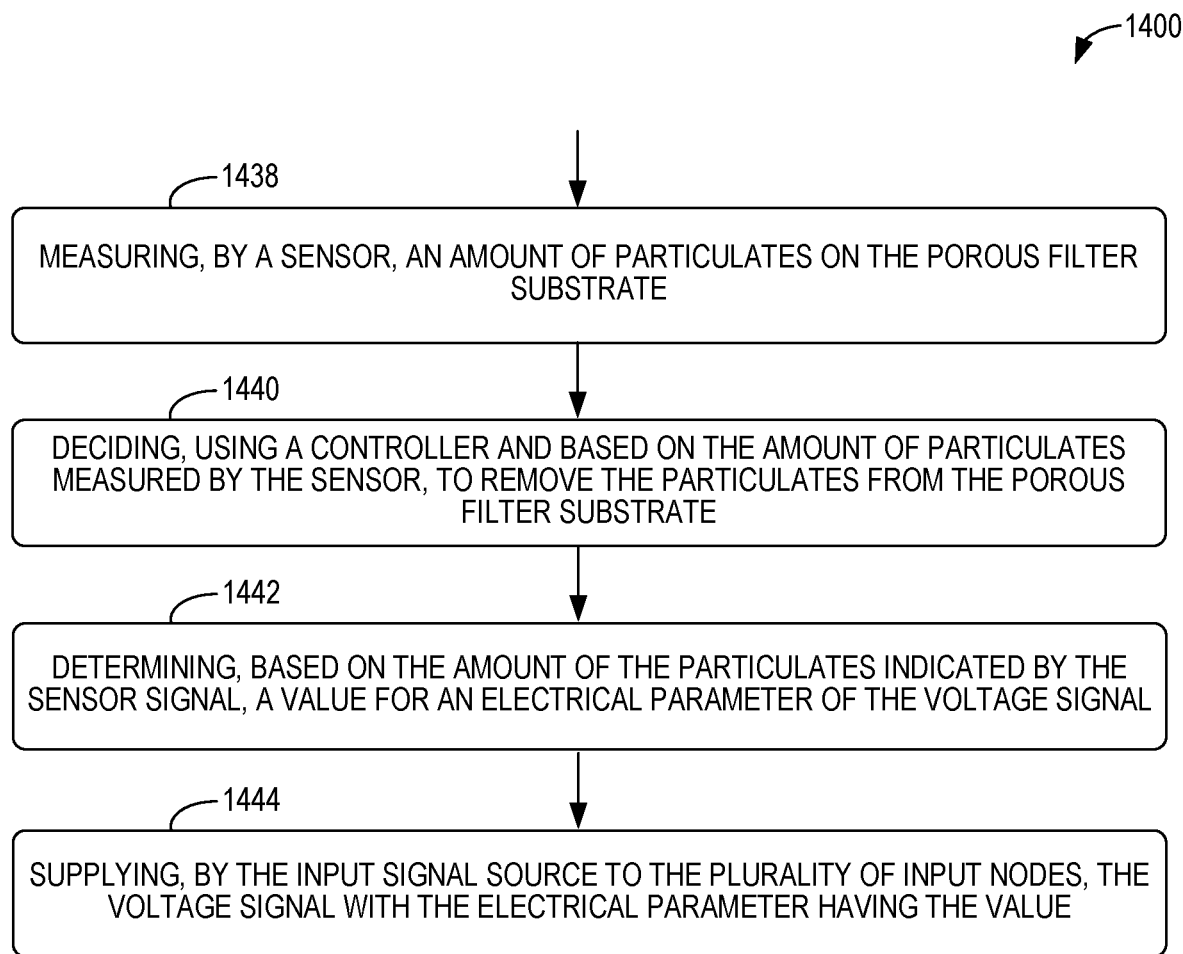
FIG. 19 depicts a flowchart for a process for removing particulates from a particulate filter for use with the process shown in FIG. 13.

As shown in FIG. 19, the process 1400 can also include measuring, by a sensor, an amount of particulates on the porous filter substrate at block 1438. Additionally, in FIG. 19, the process 1400 can include receiving, by a controller from the sensor, a sensor signal indicative of the amount of the particulates on the porous filter substrate at block 1440. The process 1400 can further include determining, based on the amount of the particulates indicated by the sensor signal, a value for an electrical parameter of the voltage signal at block 1442. The process 1400 can also include supplying, by the input signal source to the plurality of input nodes, the voltage signal with the electrical parameter having the value at block 1444.

Figure 20:
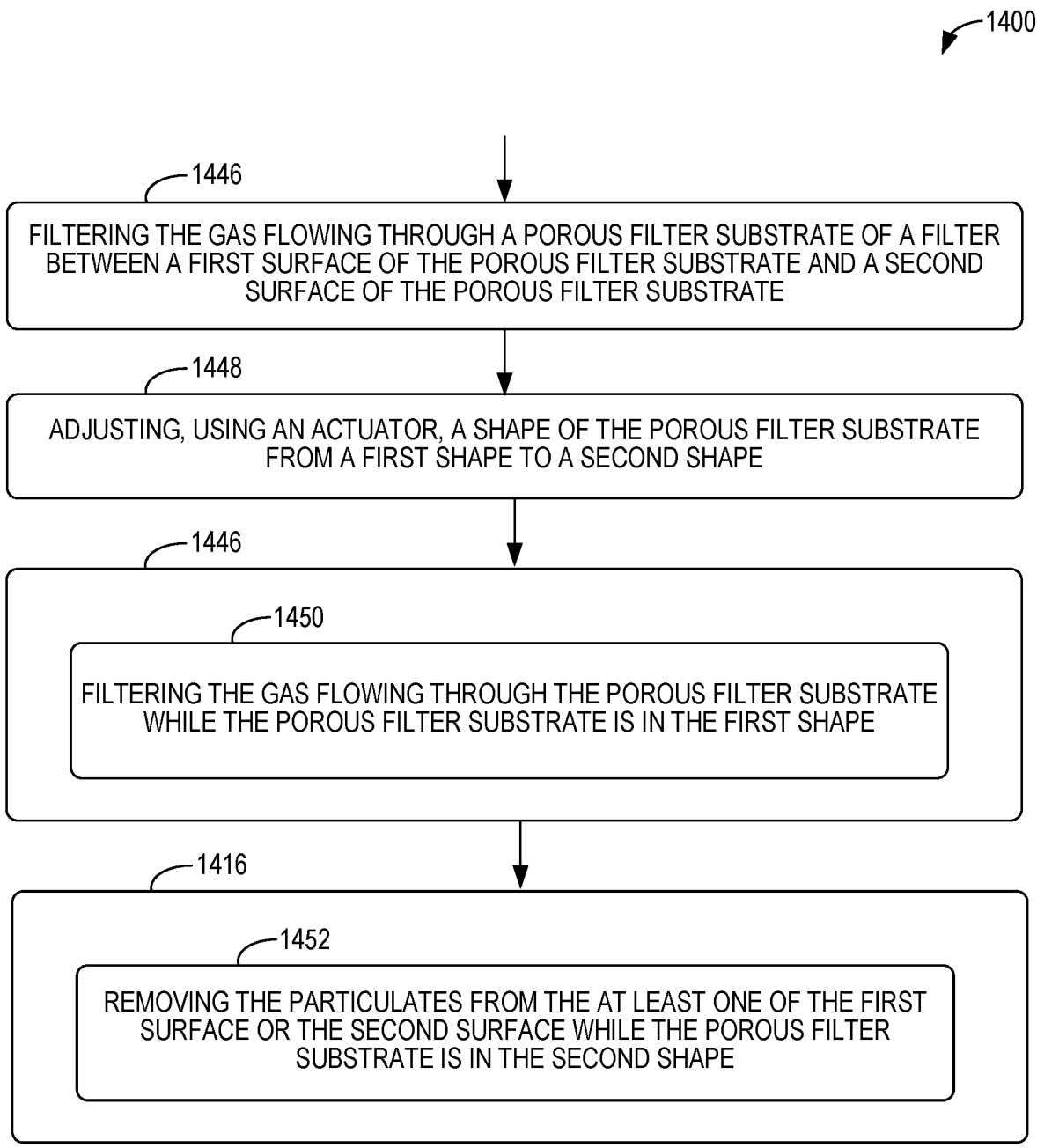
FIG. 20 depicts a flowchart for a process for removing particulates from a filter for use with the process shown in FIG. 13.

As shown in FIG. 20, the process 1400 can additionally include filtering the gas flowing through a porous filter substrate of a filter between a first surface of the porous filter substrate and a second surface of the porous filter substrate at block 1446 and adjusting, using an actuator, a shape of the porous filter substrate from a first shape to a second shape at block 1448. In FIG. 20, filtering the gas flowing through the porous filter substrate at block 1446 can include filtering the gas flowing through the porous filter substrate while the porous filter substrate is in the first shape at block 1450. Also, in FIG. 20, removing, using the electric field, the particulates from the at least one of the first surface or the second surface at block 1416 can include removing the particulates from the at least one of the first surface or the second surface while the porous filter substrate is in the second shape at block 1452.

Figure 21:
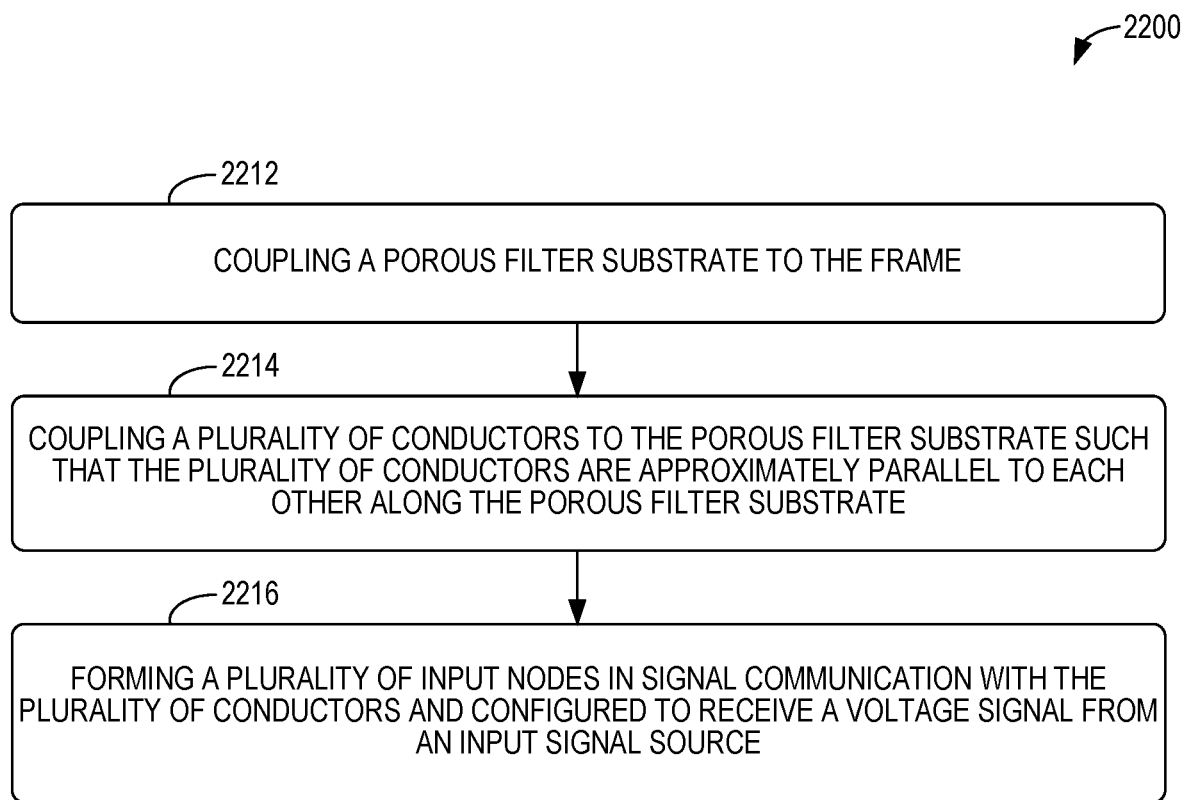
FIG. 21 depicts a flowchart for a process of making a particulate filter according to an example.

Referring now to FIG. 21, flowchart for a process 2200 of making a filter is shown according to an example. As shown in FIG. 21, the process 2200 includes coupling a porous filter substrate to a frame at block 2212. The porous filter substrate includes a first surface and a second surface. The porous filter substrate is configured to filter gas flowing through the porous filter substrate between the first surface and the second surface.

At block 2214, the process 2200 includes coupling a plurality of conductors to the porous filter substrate such that the plurality of conductors are approximately parallel to each other along the porous filter substrate. At block 2216, the process 2200 includes forming a plurality of input nodes in signal communication with the plurality of conductors and configured to receive a voltage signal from an input signal source. The plurality of conductors are configured to generate an electric field on at least one of the first surface or the second surface of the porous filter substrate in response to the plurality of input nodes receiving the voltage signal from the input signal source.

One or more of the blocks shown in FIGS. 13-21 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A filter system, comprising:
   a particulate filter comprising:
      a porous filter substrate comprising a first surface and a second surface, wherein the porous filter substrate is configured to filter a gas flowing through the porous filter substrate between the first surface and the second surface;
      a plurality of conductors coupled to the porous filter substrate, wherein the plurality of conductors are approximately parallel to each other along the porous filter substrate; and
      a plurality of input nodes in signal communication with the plurality of conductors and configured to receive a voltage signal from an input signal source, wherein the plurality of conductors are configured to generate an electric field on at least one of the first surface or the second surface of the porous filter substrate in response to the plurality of input nodes receiving the voltage signal from the input signal source; and
   an electromagnetic field generator positioned upstream of the particulate filter along a flow path of the gas,
   wherein the electromagnetic field generator is operable to generate an electromagnetic field configured to electrically charge particulates in the gas prior to the gas flowing through the porous filter substrate.

2. The filter system of claim 1, wherein the electromagnetic field generator comprises a mesh structure offset from the first surface by a gap between the electromagnetic field generator and the particulate filter.

3. The filter system of claim 2, wherein the mesh structure comprises a plurality of conductive strands defining a plurality of apertures, and
   wherein the plurality of apertures have a size that is greater than a size of the particulates in the gas.

4. The filter system of claim 1, wherein the plurality of conductors are coupled to at least one surface selected from the first surface of the porous filter substrate and the second surface of the porous filter substrate.

5. The filter system of claim 1, wherein the plurality of conductors comprise a plurality of conductive fibers woven into the porous filter substrate.

6. The filter system of claim 1, wherein the plurality of conductors extend in a first direction along the porous filter substrate, and
   wherein the particulate filter further comprises the input signal source configured to generate the voltage signal such that the electric field forms a traveling wave, which travels along the at least one of the first surface or the second surface in a second direction that is transverse to the first direction.

7. The filter system of claim 1, further comprising the input signal source configured to generate the voltage signal such that the electric field forms a standing wave on the at least one of the first surface or the second surface.

8. The filter system of claim 1, further comprising a particulate collection receptacle at a periphery of the porous filter substrate and configured to collect particulates removed from the porous filter substrate by the electric field.

9. A filter system, comprising:
   a particulate filter comprising:
      a porous filter substrate comprising a first surface and a second surface, wherein the porous filter substrate is configured to filter a gas flowing through the porous filter substrate in a direction from the first surface toward the second surface;
      a plurality of conductors coupled to the porous filter substrate, wherein the plurality of conductors are approximately parallel to each other along the porous filter substrate; and
      a plurality of input nodes in signal communication with the plurality of conductors and configured to receive a voltage signal from an input signal source, wherein the plurality of conductors are configured to generate an electric field on at least one of the first surface or the second surface of the porous filter substrate in response to the plurality of input nodes receiving the voltage signal from the input signal source; and
   a gas recirculation system comprising a duct having an inlet and an outlet, wherein the inlet of the duct is configured to receive, into the duct, the gas exiting the particulate filter at the second surface, wherein the outlet of the duct is configured to output the gas from the duct to the particulate filter at the first surface; and
   a controller in communication with the input signal source, wherein the controller is configured to:
      cause the input signal source to provide a first voltage signal while the gas flows through the porous filter substrate a first time, and
      after the gas is recirculated by the gas recirculation system, cause the input signal source to provide a second voltage signal while the gas flows through porous filter substrate a second time,
   wherein the first voltage signal differs from the second voltage signal.

10. The filter system of claim 9, wherein the first voltage signal has a first voltage level and a first waveform,
    wherein the second voltage signal has a second voltage level and a second waveform, and
    wherein the first voltage level is different than the second voltage level.

11. The filter system of claim 9, wherein the first voltage signal has a first voltage level and a first waveform,
    wherein the second voltage signal has a second voltage level and a second waveform, and
    wherein the first waveform is different than the second waveform.

12. The filter system of claim 9, further comprising an actuator configured to adjust a shape of the porous filter substrate from a first shape to a second shape,
    wherein the controller is in communication with the actuator, and wherein the controller is configured to:
cause the actuator to arrange the porous filter substrate in the first shape while the gas flows through the porous filter substrate the first time, and
after the gas is recirculated by the gas recirculation system, cause the actuator to arrange the porous filter substrate in the second shape while the gas flows through porous filter substrate the second time.

13. The filter system of claim 12, wherein the porous filter substrate has a plurality of accordion-folded pleats comprising a plurality of panels and a plurality of fold lines between respective ones of the plurality of panels, and
wherein the actuator is configured to move at least one panel of the plurality of panels relative to at least another panel of the plurality of panels to adjust the shape of the porous filter substrate from the first shape to the second shape.

14. The filter system of claim 9, wherein the gas recirculation system further comprises a damper that is actuatable between a first position and a second position,
wherein, when the damper is in the first position, the damper is configured to direct the gas toward the inlet of the duct of the gas recirculation system, and
wherein, when the damper is in the second position, the damper is configured to allow the gas to flow away from the inlet of the duct of the gas recirculation system.

15. The filter system of claim 14, wherein the controller is in communication with the damper, and
wherein the controller is configured to actuate the damper from the first position to the second position after the gas flows through porous filter substrate the second time.

16. The filter system of claim 9, wherein the gas recirculation system comprises a recirculation fan configured to increase a flow of the gas from the inlet to the outlet.

17. The filter system of claim 9, further comprising a particulate collection receptacle at a periphery of the porous filter substrate and configured to collect particulates removed from the porous filter substrate by the electric field.

18. A filter system, comprising:
a particulate filter comprising:
a porous filter substrate comprising a first surface and a second surface, wherein the porous filter substrate is configured to filter a gas flowing through the porous filter substrate between the first surface and the second surface;
a plurality of conductors coupled to the porous filter substrate, wherein the plurality of conductors are approximately parallel to each other along the porous filter substrate; and
a plurality of input nodes in signal communication with the plurality of conductors and configured to receive a voltage signal from an input signal source, wherein the plurality of conductors are configured to generate an electric field on at least one of the first surface or the second surface of the porous filter substrate in response to the plurality of input nodes receiving the voltage signal from the input signal source; and
a gas mover positioned upstream of the particulate filter along a flow path of the gas, wherein the gas mover is configured to direct a stream of gas in a direction that is transverse to a direction of the flow path of the gas that flows through the porous filter substrate such that the gas mover is operable to generate a turbulence in the gas prior to the gas flowing through the porous filter substrate.

19. The filter system of claim 18, wherein the plurality of conductors are coupled to at least one surface selected from the first surface of the porous filter substrate and the second surface of the porous filter substrate.

20. The filter system of claim 18, wherein the gas mover comprises a fan.

* * * * *